(12) United States Patent
Matsubara et al.

(10) Patent No.: US 7,113,571 B2
(45) Date of Patent: Sep. 26, 2006

(54) COMMUNICATION SYSTEM, COMMUNICATION MANAGEMENT SYSTEM AND METHOD

(75) Inventors: Akira Matsubara, Tokyo (JP); Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1170 days.

(21) Appl. No.: 09/754,067

(22) Filed: Jan. 5, 2001

(65) Prior Publication Data

US 2001/0022788 A1 Sep. 20, 2001

(30) Foreign Application Priority Data

Jan. 6, 2000 (JP) ............................. P2000-005794

(51) Int. Cl.
*H04M 1/64* (2006.01)
(52) U.S. Cl. .......................... 379/72; 370/462; 705/14; 709/231
(58) Field of Classification Search ................. 705/75, 705/64, 67; 455/412.1; 340/539.11; 704/246
See application file for complete search history.

(56) References Cited

U.S. PATENT DOCUMENTS

| 5,757,788 | A  | * | 5/1998 | Tatsumi et al. ............. 370/336 |
| 6,256,747 | B1 | * | 7/2001 | Inohara et al. ................. 714/4 |
| 6,281,811 | B1 | * | 8/2001 | Ranzino ..................... 340/988 |
| 6,519,463 | B1 | * | 2/2003 | Tendler ................... 455/456.3 |
| 6,594,347 | B1 | * | 7/2003 | Calder et al. ............ 379/88.01 |
| 6,704,294 | B1 | * | 3/2004 | Cruickshank ............... 370/265 |
| 6,736,726 | B1 | * | 5/2004 | Miura .......................... 463/41 |
| 6,853,987 | B1 | * | 2/2005 | Cook .......................... 705/75 |

FOREIGN PATENT DOCUMENTS

JP 409233193 * 9/1996

* cited by examiner

*Primary Examiner*—Gerald Gauthier
(74) *Attorney, Agent, or Firm*—Rader, Fishman & Grauer, PLLC; Ronald P. Kananen

(57) ABSTRACT

A communications system, a communication management system and method are disclosed. Distribution information is distributed to communication terminal devices to which communication lines are connected. And a privilege is assigned to a user of the communication terminal device to which the distribution information is distributed.

22 Claims, 23 Drawing Sheets

KEYWORD-CATEGORY TABLE

| LARGE CATEGORY | INTERMEDIATE CATEGORY | KEYWORD |
|---|---|---|
| SPORTS | GOLF | COUNTRY CLUB, .. OPEN, ··· |
|  | BASEBALL | HOME RUN, MAGIC, RATE OF DEFENSE, HIT |
|  | ⋮ | ⋮ |
| MUSIC | POPS (JAPANESE) | ○○○, ○□□, □△○, ··· |
|  | POPS (WESTERN) | ○×□, □×□, △○△, ··· |
|  | CLASSICAL MUSIC | □□□, △△△, ×××, ··· |
|  | ⋮ | ⋮ |
| FOOD | JAPANESE FOOD | TENPURA, SUSHI, ··· |
|  | ITALIAN FOOD | PASTA, ··· |
|  | ⋮ | ⋮ |

ADVERTISEMENT-CATEGORY TABLE

| LARGE CATEGORY | INTERMEDIATE CATEGORY | ADVERTISEMENT |
|---|---|---|
| SPORTS | GOLF | ... SPORTS SHOP, |
|  | BASEBALL | ... SPORTS SHOP, |
|  | ⋮ | ⋮ |
| MUSIC | POPS (JAPANESE) | ... LAST LIVE PERFORMANCE, ... NEW RELEASE |
|  | POPS (WESTERN) | ... CONCERT IN JAPAN, |
|  | CLASSICAL MUSIC | ... SYMPHONY, ... PHILHARMONIC |
|  | ⋮ | ⋮ |
| FOOD | JAPANESE FOOD | SHABU-SHABU AS MUCH AS YOU LIKE |
|  | ITALIAN FOOD | ○△□, ··· |
|  | ⋮ | |

| ADVERTISEMENT POINT | CONTRACT FEE | FUNDAMENTAL RATE | TELEPHONE CONVERSATION RATE |
|---|---|---|---|
| 0 | ¥3,000 | ¥4,000 | ¥20/MINUTE |
| 10POINTS | ¥2,700 | ¥3,600 | ¥18/MINUTE |
| 20POINTS | ¥2,400 | ¥3,200 | ¥16/MINUTE |
| 30POINTS | ¥2,100 | ¥2,800 | ¥14/MINUTE |

PHONE NUMBER-CATEGORY TABLE

| LARGE CATEGORY | INTERMEDIATE CATEGORY | PHONE NUMBER |
|---|---|---|
| SPORTS | GOLF | ○○-×××-×××, ○×-×○×-×××, ... |
| | BASEBALL | ○×-×○○-△×△, △△-○×○-○○○, ... |
| | ⋮ | ⋮ |
| MUSIC | POPS (JAPANESE) | ××-○○○-□□□, □×-×□○-○□×, ... |
| | POPS (WESTERN) | □□-△○△-△○△, △×-△××-××○, ... |
| | CLASSICAL MUSIC | ×○-××○-□□△, □○-○△△-△△○, ... |
| | ⋮ | ⋮ |
| FOOD | JAPANESE FOOD | ○△-□○□-△×○, ... |
| | FRENCH FOOD | △○-△△□- |
| | ⋮ | |

|  | MON. | TUE. | WED. | THU. | FRI. | SAT. | SUN. |
|---|---|---|---|---|---|---|---|
| 6:00 \| 12:00 | AREA A | AREA A | AREA A | AREA A | AREA A | AREA C | AREA C |
| 12:00 \| 18:00 | AREA A | AREA E | AREA A | AREA F | AREA A | AREA C | AREA X |
| 18:00 \| 24:00 | AREA A | AREA D | AREA B | AREA C | AREA D | AREA E | AREA X |
| 24:00 \| 6:00 | AREA A | AREA A | AREA A | AREA A | AREA D | AREA A | AREA A |

FIG. 25

COMMUNICATION SYSTEM, COMMUNICATION MANAGEMENT SYSTEM AND METHOD

BACKGROUND OF THE INVENTION

1. Field of the Invention

The present invention relates to a communications system, a communication management system and method, and more particularly, to a communication system, a communications management system and method for distributing an advertisement during a telephone conversation.

2. Description of the Related Art

Conventionally, for example, a telephone for domestic use, etc. and a portable telephone terminal through a common line is connected to a specific line assigned by a common carrier, and simultaneously assigned a phone number corresponding to the line by a user making a contract for subscription with the common carrier.

Then, the user can receive a call from another subscriber through the common carrier by the phone number specified, or can issue a call to another subscriber through the common carrier by specifying the phone number of the another subscriber.

The rate for issuing and receiving calls is normally charged to a call issuing user, and the amount set based on the usage (time, day-of-week, telephone conversation time length, the address of a receiver, etc.) of the user is charged to the user.

Therefore, since the telephone rate is charged to the user as the predetermined amount based on the use of the issuing user, the longer the user communicates, the larger amount is charged to the user.

SUMMARY OF THE INVENTION

In view of the foregoing, an object of this invention is to provide a communication system, a communication management system and method to significantly improve a user's convenience.

The foregoing object and other objects of the invention have been achieved by the provision of a communication system which comprises: line connection means for connecting lines between communication terminal devices; communication management means for managing communication between the communication terminal devices through the line connection means; information supply means for supplying distribution information to the communication management means; information distribution means, provided in the communication management means, for distributing the distribution information to a corresponding communication terminal device; privilege assignment means, provided in the communication management means, for assigning a privilege to a user of the communication terminal device to which the distribution information is distributed.

As a result, in this communication system, a charge to a user can be reduced, and the distribution information can be effectively distributed to communication terminal devices of users by the communication between the communication terminal devices in return for the distribution of the distribution information to the communication terminal devices of the users.

Furthermore, according to the present invention, a communication management system for managing communication between communication terminal devices comprises: information distribution means for distributing distribution information to the communication terminal devices to which communication lines are connected; and privilege assignment means for assigning a privilege to a user of the communication terminal device to which the distribution information is distributed.

As a result, in this communication management system, a charge to a user can be reduced, and the distribution information can be effectively distributed to communication terminal devices of users by the communication between the communication terminal devices in return for the distribution of the distribution information to the communication terminal devices of the users.

Still further, according to the present invention, a communication management method for managing communication between communication terminal devices comprises: a first step of distributing distribution information to the communication terminal devices to which communication lines are connected; and a second step of assigning a privilege to a user of the communication terminal device to which the distribution information is distributed.

As a result, in this communication management method, a charge to a user can be reduced, and the distribution information can be effectively distributed to communication terminal devices of users by the communication between the communication terminal devices in return for the distribution of the distribution information to the communication terminal devices of the users.

Further yet, according to the present invention, a communication system comprises: plural communication terminal devices for communicating with each other via a channel; information supplying means for supplying information to a designated communication terminal device among the communication terminal devices; and privilege assignment means for, after being notified by the communication terminal device that the information is confirmed by a user of the communication terminal device, assigning a privilege to the notified communication of the communication terminal device.

As a result, in this communication system, a charge to a user can be reduced, and the distribution information can be effectively distributed to communication terminal devices of users by the communication between the communication terminal devices in return for the distribution of the distribution information to the communication terminal devices of the users.

Furthermore, according to the present invention, a communication management method for managing the communication of communication terminal device connected via a channel comprises: the steps of supplying information via the channel corresponding to the communication terminal device to a the designated communication terminal device; and receiving a confirmation result that the information supplied from the communication terminal device has been confirmed.

As a result, in this communication management method, a charge to a user can be reduced, and the distribution information can be effectively distributed to communication terminal devices of users by the communication between the communication terminal devices in return for the distribution of the distribution information to the communication terminal devices of the users.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 10 is a block diagram of the configuration of the keyword-category table;

FIG. 11 is a block diagram of the configuration of the advertisement-category table;

FIG. 21 is a schematic view of the configuration of a discount rate table;

FIG. 24 is a schematic view of the configuration of the phone number-category table;

FIG. 25 is a schematic view of the action pattern of a user;

DETAILED DESCRIPTION OF THE EMBODIMENT

Preferred embodiments of this invention will be described with reference to the accompanying drawings:

(1) First Embodiment (1-1) Configuration of Communication System

Figure 1:
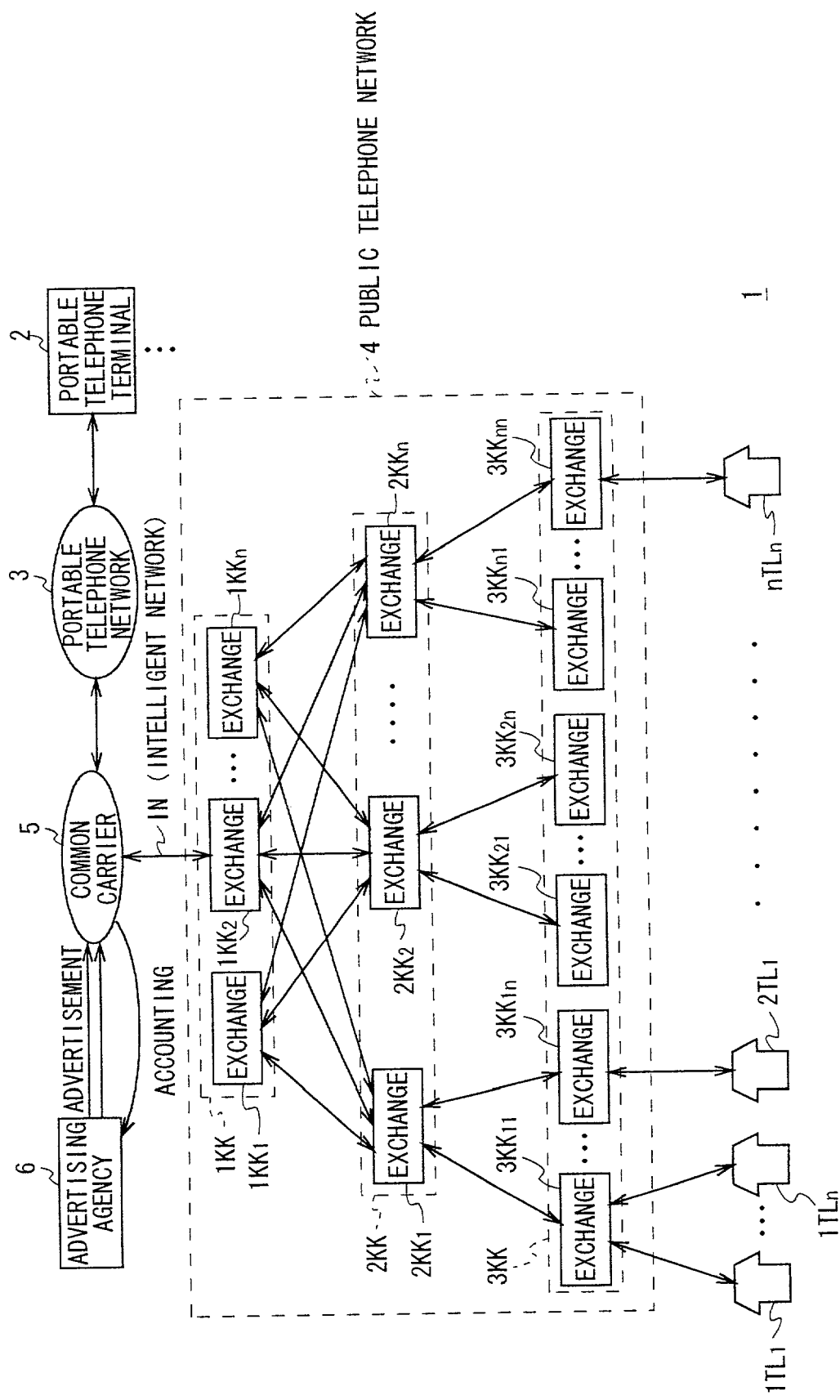
FIG. 1 is a block diagram of the configuration of the communication system according to a first embodiment of the present invention.

In FIG. 1, 1 indicates a communication system according to the first embodiment of the present invention. A portable telephone terminal 2 of a user and telephones $1TL_1$ to $1TL_1$, and $2TL_1$ to $nTL_n$ are connected to a common carrier 5 through corresponding portable telephone networks 3 and public telephone networks 4. An advertising agency 6 is connected to the common carrier 5.

When a user inputs the phone number of a desired user, the portable telephone terminal 2 and the telephones $1TL_1$ to $nTL_n$ issue the phone numbers of the predetermined portable telephone terminal 2 or the telephones 1TL1 to nTLn (transmitting side) and the phone numbers of the users (receiving side) set by the transmitting user to the common carrier 5 through the corresponding portable telephone network 3 or the public telephone network 4.

After the common carrier 5 retrieves a corresponding receiving user according to the calling and receiving phone numbers provided by the portable telephone terminal 2 and the telephones $1TL_1$ to $nTL_n$, it connects the portable telephone terminal 2 of the calling user or the telephones $1TL_1$ to $nTL_n$ with the receiving user's portable telephone terminal (not shown in the attached drawings) or the telephones $1TL_1$ to $nTL_n$.

The portable telephone network 3 comprises: a base station (not shown in the attached drawings) for receiving an electric wave of the portable telephone terminal 2, and transmitting an electric wave from a common carrier to the portable telephone terminal 2; and a portable telephone line (not shown in the attached drawings) for connecting the base station with the common carrier 5.

The public telephone network 4 is configured by sequentially and hierarchically interconnecting a first exchange group 1KK comprising exchanges $1KK_1$, $1KK_2$ to $1KK_n$, a second exchange group 2KK comprising exchanges $2KK_1$, $2KK_2$ to $2KK_n$, and a third exchange group 3KK comprising exchanges $3KK_{11}$ to $3KK_{1n}$, $3KK_{21}$ to $3KK_{2n}$, and exchanges $3KK_{n1}$ to $3KK_{nn}$.

The third exchange group 3KK is provided in a city, town, or village unit in which a user lives. A second exchange group 2KK is provided in a metropolis or prefecture unit. The first exchange group 1KK is provided in a special service number unit (for example, free communication phone number starting with 0120, an information supply telephone, etc. starting with 0990, etc.).

A phone number issued by a user from the portable telephone terminal 2 is transmitted to the common carrier 5 through the portable telephone network 3, and a receiver is retrieved by the common carrier 5 according to the transmitted phone number. If the receiver is the portable telephone terminal 2, the portable telephone terminal 2 on the transmitting side is connected to the portable telephone terminal 2 on the receiving side through the portable telephone network 3. If the receiver is the telephones $1TL_1$ to $nTL_n$, the portable telephone terminal 2 on the transmitting side is connected to the portable telephone terminal 2 on the receiving side sequentially through the portable telephone network 3, the common carrier 5, and a corresponding exchange $1KK_2$ in the first exchange group 1KK, corresponding exchanges $2KK_1$, $2KK_2$ to $2KK_n$ in the second exchange group 2KK, and the exchanges $3KK_{11}$ to $3KK_{mn}$ corresponding to the telephones $1TL_1$ to $nTL_n$ on the receiving side in the third exchange group 3KK in the public telephone network 4.

The phone number issued by a user from the telephones $1TL_1$ to $nTL_n$ is transmitted to the corresponding exchanges $2KK_1$ to $2KK_n$ in the second exchange group 2KK through the corresponding exchanges $3KK_{11}$ to $3KK_{mn}$ in the third exchange group 3KK, transmitted to the exchanges $1KK_1$ to $1KK_n$ corresponding to the special service number in the first exchange group 1KK, and then transmitted from the exchanges $1KK_1$ to $1KK_n$ of the first exchange group 1KK to the common carrier 5 through a so-called intelligent network IN.

Thus, the common carrier 5 retrieves a corresponding user according to a received phone number. If it is the portable telephone terminal 2, the portable telephone terminal 2 on the transmitting side is connected to the portable telephone terminal 2 on the receiving side through the portable telephone network 3. If the corresponding user is the telephones $1TL_1$ to $nTL_n$, the telephones $1TL_1$ to $nTL_n$ on the transmitting side are connected to the telephones $1TL_1$ to $nTL_n$ on the receiving side sequentially through the corresponding exchange $1KK_1$ in the first exchange group 1KK, the corresponding exchanges $2KK_1$ to $2KK_n$ in the second exchange group 2KK, the exchanges $3K_{11}$ to $3KK_{mn}$ corresponding to the telephones $1TL_1$ to $1TL_n$ on the transmitting side, and the exchanges $3KK_{n1}$ to $3KK_{nm}$ corresponding to the telephones $1TL_1$ to $1TL_n$ on the receiving side in the third exchange group 3KK.

In the information transmission system 1 with the above mentioned configuration, an advertising agency 6 is connected to the common carrier 5, and the advertising agency 6 provides advertisement information for the common carrier 5 in advance, and is charged a distribution rate for the distribution of the advertisement information by the common carrier 5, thereby paying the common carrier 5 the distribution rate for the advertisement information.

When the user issues a call to another user using the portable telephone terminal 2 or the telephones $1TL_1$ to $nTL_n$, the common carrier 5 discounts the use rate of the portable telephone terminal 2 or the telephones $1TL_1$ to $nTL_n$ by the amount set depending on the advertisement information in return for the distribution of the advertisement information to the portable telephone terminal 2 or the telephones $1TL_1$ to $nTL_n$ of the user during a telephone conversation through the portable telephone network 3 or the public telephone network 4.

For example, when advertisement information is distributed in the telephone conversation in the above mentioned embodiment, the telephone conversation is temporarily suspended, and when the advertisement information is completely distributed, a normal telephone conversation is permitted.

Thus, in the information transmission system 1, the common carrier 5 distributes advertisement information to the portable telephone terminal 2 or the telephones $1TL_1$ to $1TL_n$ in telephone conversation, and in return it discounts the rate of use of the portable telephone terminal 2 or the telephones $1TL_1$ to $nTL_n$ to which the advertisement information is distributed by the amount set depending on the distributed advertisement information.

(1-2) Configuration of Common Carrier

Figure 2:
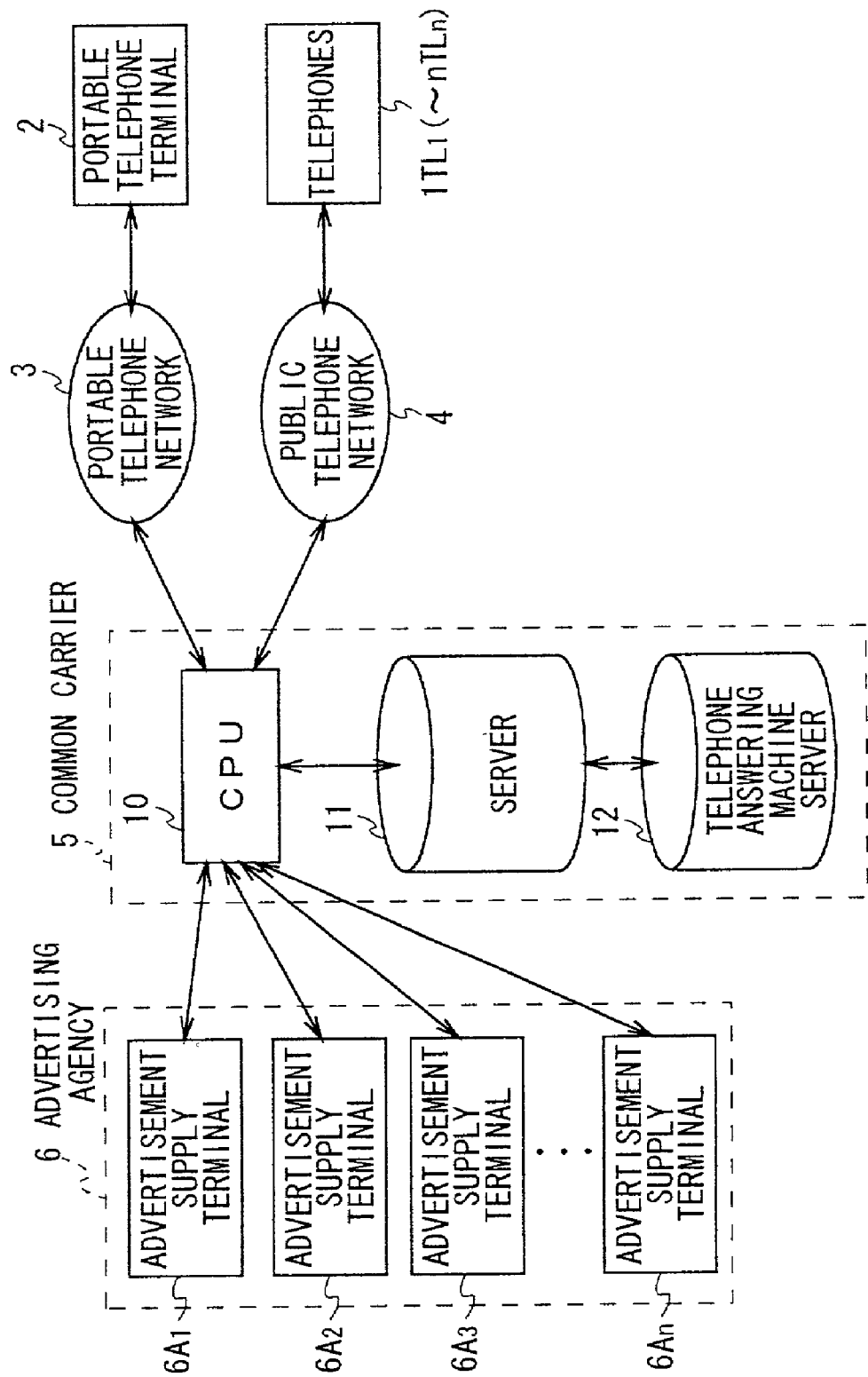
FIG. 2 is a block diagram of the configuration of the communication system according to the first embodiment of the present invention.

Actually, as shown in FIG. 2, the common carrier 5 is configured by interconnecting a central processing unit (CPU) 10 and a server 11, and connecting the CPU 10 to a telephone answering machine server 12 through the server 11.

The CPU 10 is connected to the portable telephone terminal 2 and the telephones $1TL_1$ to $nTL_n$ through the corresponding portable telephone network 3 and the public telephone network 4, and is connected to a plurality of advertisement supply terminals $6A_1$ to $6A_n$ of the advertising agency 6.

Then, the CPU 10 manages the telephone of the user through the portable telephone terminal 2 and the telephones $1TL_1$ to $nTL_n$, and accumulates in the server 11 the advertisement information provided from each of the advertisement supply terminals $6A_1$ to $6A_n$ of the advertising agency 6 and the rate table (not shown in the attached drawings) set depending of the advertisement information.

When a telephone answering service is set as an optional 4 service for the portable telephone terminal 2, the CPU 10 records the call to the portable telephone terminal 2 for a predetermined time, and accumulates it in the telephone answering machine server 12.

When a user provides the CPU 10 with the phone numbers of the transmitting and receiving sides from the portable telephone terminal 2 or the telephones $1TL_1$ to $nTL_n$ through the corresponding portable telephone network 3 or the public telephone network 4, the CPU 10 retrieves the corresponding user according to the phone number, and then connects the portable telephone terminal 2 or the telephones $1TL_1$ to $nTL_n$ of the user with the portable telephone terminal or the telephones $1TL_1$ to $nTL_n$ of the receiving user.

When the CPU 10 checks the telephone conversation between the connected users, it reads the advertisement information accumulated in the server 11, and distributes the read information to the corresponding portable telephone terminal 2 or telephones $1TL_1$ to $nTL_n$ in telephone conversation through the corresponding portable telephone network 3 and public telephone network 4.

Figure 3:
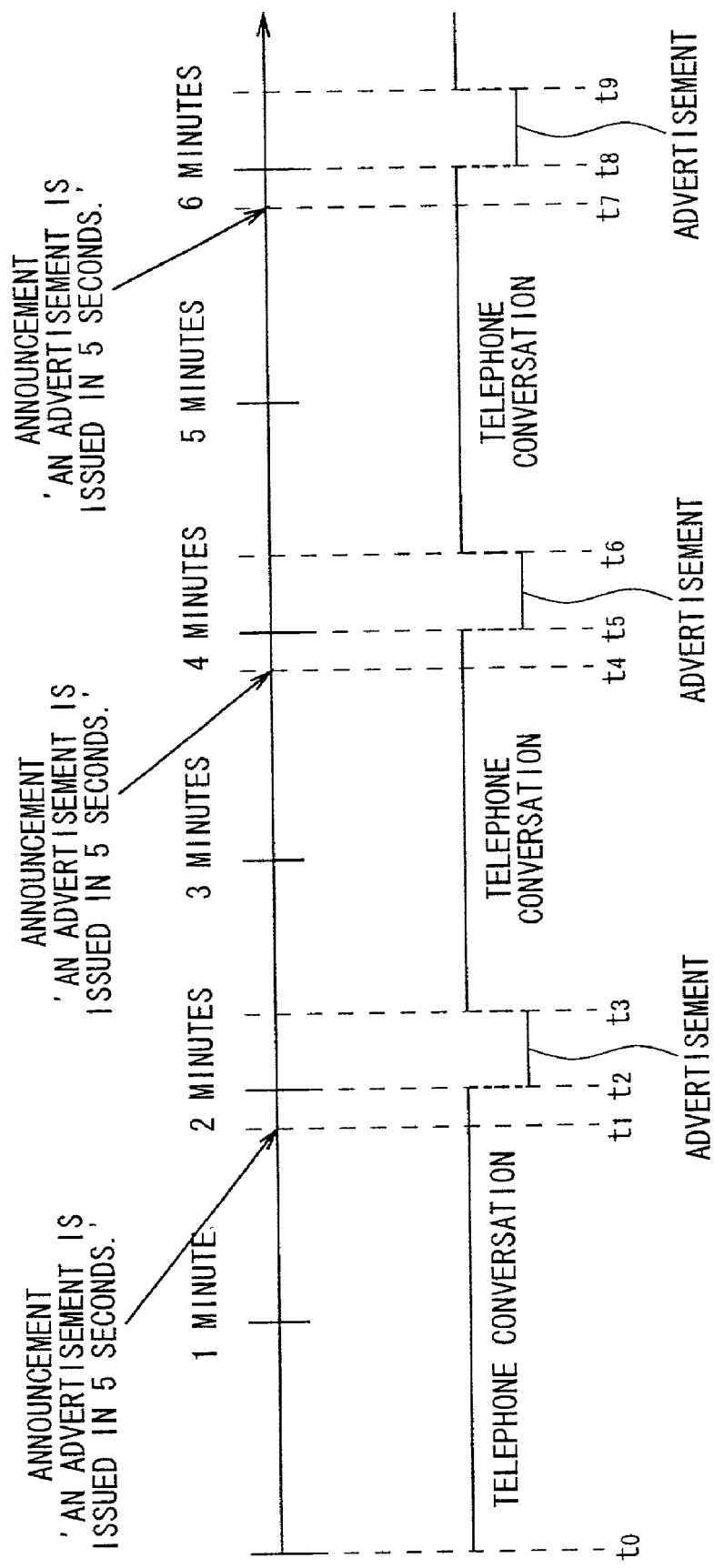
FIG. 3 is a schematic view of the circuit for explanation of the flow of the distribution of advertisement information during telephone conversation.

In the distribution of the advertisement information during the telephone conversation, as shown in FIG. 3, for example, an advance announcement that an advertisement is issued in 5 seconds is made under control of the CPU 10 at a time point $t_1$ after a predetermined time from the time point $t_0$ at which telephone conversation starts, and then the advertisement information read by the CPU 10 from the server 11 is distributed under the control of the CPU 10 during a period from a time point $t_2$ to a time point $t_3$.

Similarly, during the telephone conversation, the advance announcement is issued at each time point $t_4$ and $t_7$ under control of the CPU 10, and the advertisement information is distributed at each period from $t_5$ to $t_6$ and from $t_8$ to $t_9$.

Thus, the advertisement information distributed to the portable telephone terminal 2 or the telephones $1TL_1$ to $nTL_n$ comprises voice data, image data, text data, etc. For example, when the advertisement information comprises voice data, the telephone conversation of a user is temporarily suspended, and an advertisement is issued based on the voice data to the portable telephone terminal 2 or the telephones $1TL_1$ to $nTL_n$ of the user in telephone conversation.

Figure 4A:
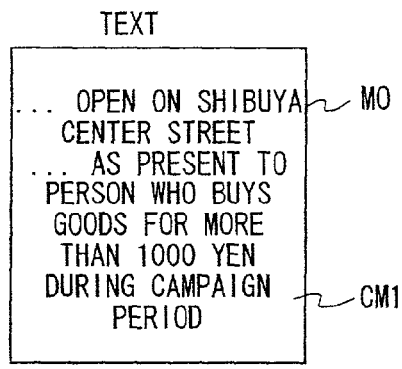
FIGS. 4A and 4B are schematic views of the circuit for explanation of the process of displaying an advertisement.
Figure 4B:
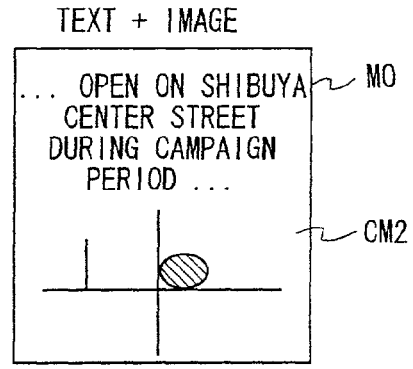

When the advertisement information comprises text data, an advertisement CM1 based on the text data is displayed on the display unit MO of the portable telephone terminal 2 or the telephones $1TL_1$ to $nTL_n$ of the user in telephone conversation as shown in FIG. 4A. When the advertisement information comprises text data and image data, an advertisement CM2 based on the text data and the image data is displayed on the display unit MO of the portable telephone terminal 2 or the telephones $1TL_1$ to $nTL_n$ of the user in telephone conversation as shown in FIG. 4B.

In return for the distribution of the advertisement information to the portable telephone terminal 2 or the telephones $1TL_1$ to $nTL_n$ of a user, the CPU 10 discounts the rate of use of the portable telephone terminal 2 or the telephones $1TL_1$ to $nTL_n$ of the user by the amount set based on the distributed advertisement information. Such accounting information is recorded in the accounting database of the server 11.

Thus, when the telephone conversation by a user starts under control of the CPU 10, the common carrier 5 issues an advance announcement at predetermined intervals to the portable telephone terminal 2 or the telephones $1TL_1$ to $nTL_n$ of the user during telephone conversation, reads advertisement information provided by the advertising agency 6 and accumulated in the server 11, distributes the read information to output the advertisement based on the voice data or display the advertisements CM1 and CM2 based on the text data and/or image data on the display unit MO of the portable telephone terminal 2 or the telephones $1TL_1$ to $nTL_n$ for a predetermined period, and the user checks the advertisement by viewing or hearing it. Thus, the rate of use of the portable telephone terminal 2 or the telephones $1TL_1$ to $nTL_n$ can be discounted by the amount set depending on the checked advertisement.

(1-3) Procedure of Advertisement Distributing Process

Figure 5:
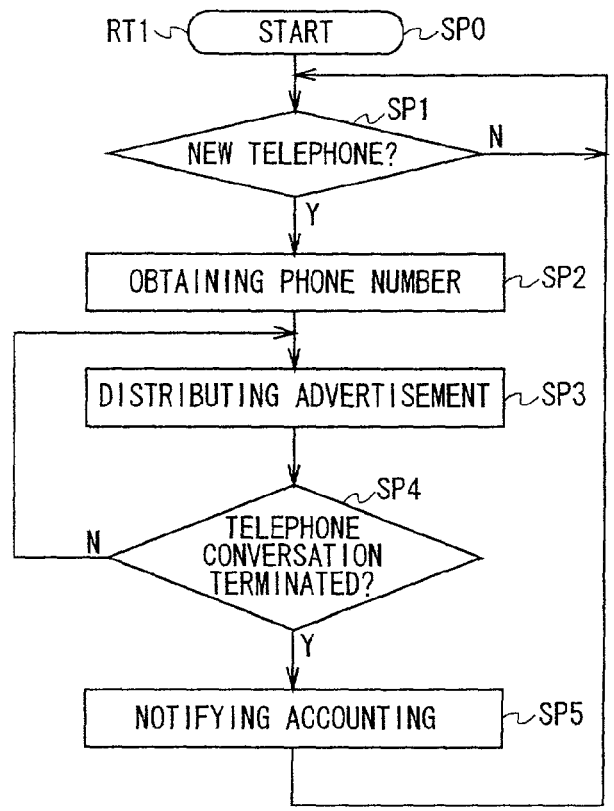
FIG. 5 is a flowchart for explanation of the advertisement distributing procedure.

Practically, in the communication system 1, the CPU 10 of the common carrier 5 is provided with a advertisement distributing unit (not shown in the attached drawings) and an accounting unit (not shown in the attached drawings). The advertisement distributing unit starts the advertisement distributing procedure RT1 as shown in FIG. 5 in step SP0 when the information transmission system 1 is activated under control of the CPU 10, and distributes advertisement information at predetermined time intervals during the telephone conversation of a user when the user starts communication with another user on the phone.

The advertisement distributing unit is one of the application programs in the CPU 10 of the common carrier 5, and the advertisement distributing procedure RT1 described below is practically performed by the CPU 10.

That is, the advertisement distributing unit starts the advertisement distributing procedure RT1 in step SP0 when the information transmission system 1 is activated, waits for a call request issued by transmitting the phone numbers of a transmitter and a receiver from the portable telephone terminal 2 or the telephones $1TL_1$ to $nTL_n$ of a user in step SP1, enters the next step SP2 when an acknowledgment result can be obtained by issuing a call request through the portable telephone terminal 2 or the telephones $1TL_1$ to $nTL_n$, and obtains the phone numbers of the transmitter and the receiver transmitted at the call request.

Then, the advertisement distributing unit connects the telephone of the transmitter to the telephone of the receiver according to the phone numbers of the transmitter and the receiver obtained in step SP2, distributes an advance announcement and advertisement information at predetermined time intervals to the corresponding portable telephone terminal 2 and the telephones $1TL_1$ to $nTL_n$ during the telephone conversation between the users on the phone in step SP3, and enters the next step SP4.

In step SP4, the advertisement distributing unit determines whether or not the telephone conversation terminates. When the advertisement distributing unit obtains a negative result indicating that the telephone conversation continues, it returns to step SP3, distributes again the advance announcement and the advertisement information to the corresponding portable telephone terminal 2 and telephones $1TL_1$ to $nTL_n$ at predetermined time intervals, and sequentially repeats the loop of step SP3 to SP4 until the telephone conversation terminates.

When a negative result is obtained in step SP4 by the termination of the telephone conversation, control is passed to the next step SP5, the advertisement distributing unit notifies the accounting unit of the distribution data based on the distribution situation of the advertisement information during the telephone conversation and the accounting data containing the phone number of the transmitter of the telephone conversation, etc., and control is returned to step SP1.

When the advertisement distributing unit receives a call request from the portable telephone terminal 2 or the telephones $1TL_1$ to $nTL_n$ of a user, it sequentially repeats the loop of step SP1-SP2-SP3-SP4-SP5, and distributes advertisement information at predetermined time intervals to the corresponding portable telephone terminal 2 and the telephones $1TL_1$ to $nTL_n$ in telephone conversation.

(1-4) Accounting Procedure

Figure 6:
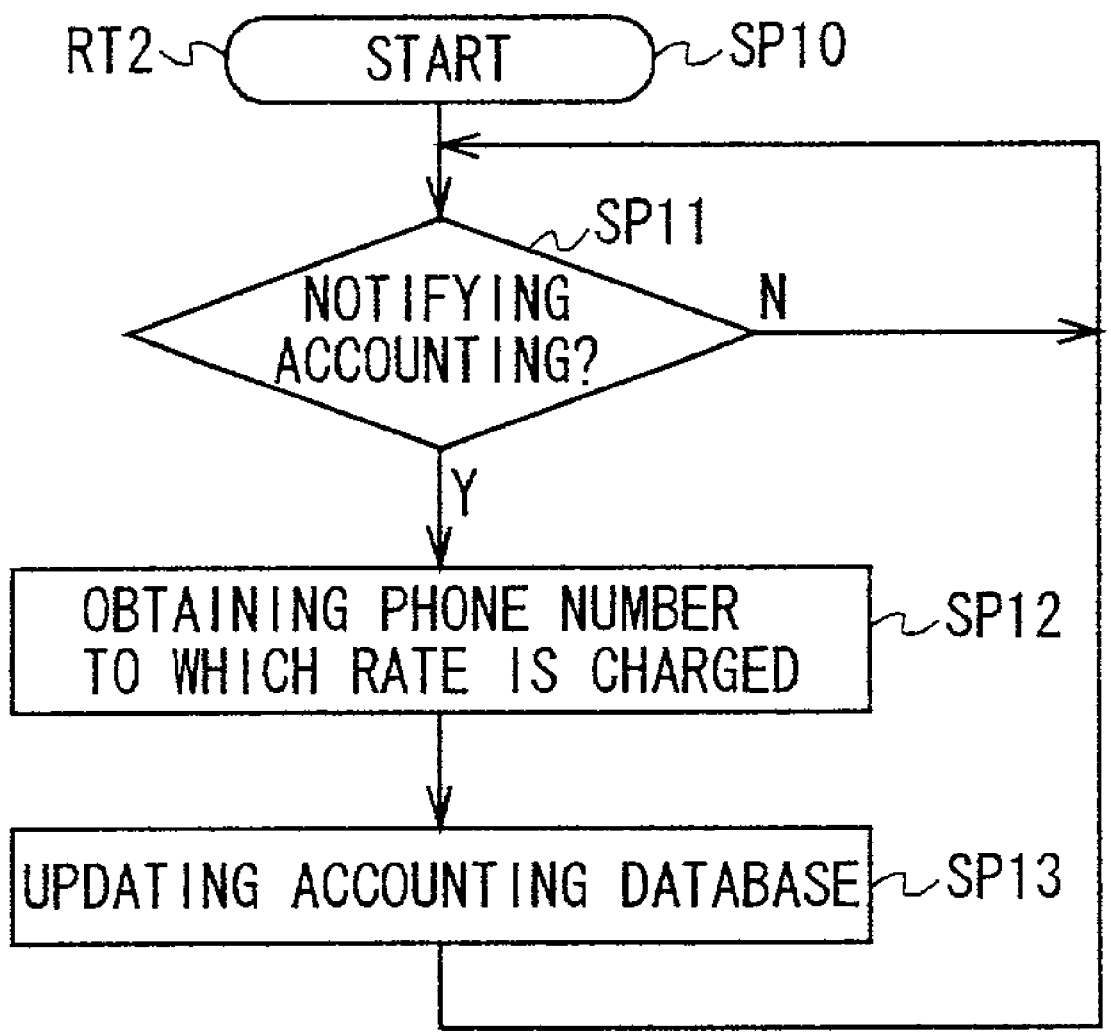
FIG. 6 is a flowchart for explanation of the accounting procedure.

In the communication system 1, the accounting unit of the CPU 10 of the common carrier 5 starts the accounting procedure RT2 shown in FIG. 6 from step SP10 when the information transmission system 1 is activated under control of the CPU 10, and computes the rate charged for the terminated telephone conversation based on the accounting data notified by the advertisement distributing unit.

The accounting unit is included in the application program performed by the CPU 10 of the common carrier 5, and the accounting procedure RT2 described below is actually performed by the CPU 10.

That is, the accounting unit starts the accounting procedure RT2 from step SP10 when the information transmission system 1 is activated, control is passed to the next step SP11, and the accounting unit waits for the notification of the accounting data from the advertisement distributing unit.

When the accounting unit obtains an acknowledgment result in step SP11 by being notified of the accounting data by the advertisement distributing unit, it enters step SP12, and obtains the phone number to be charged to based on the notified accounting data.

Then, the accounting unit enters the next step SP13, subtract, based on the accounting data the discount amount set based on the advertisement information distributed during the telephone conversation from the telephone conversation rate for the telephone conversation, associates the obtained telephone conversation rate with the phone number to be charged to, records them in the accounting database of the server 11, and updates the accounting database.

Back in step SP11, the accounting unit waits for the notification of the new accounting data from the advertisement distributing unit, and sequentially repeats the loop of step SP11-SP12-SP13 each time the accounting data is received from the advertisement distributing unit.

(1-5) Operation and Effect of First Embodiment

Figure 7:
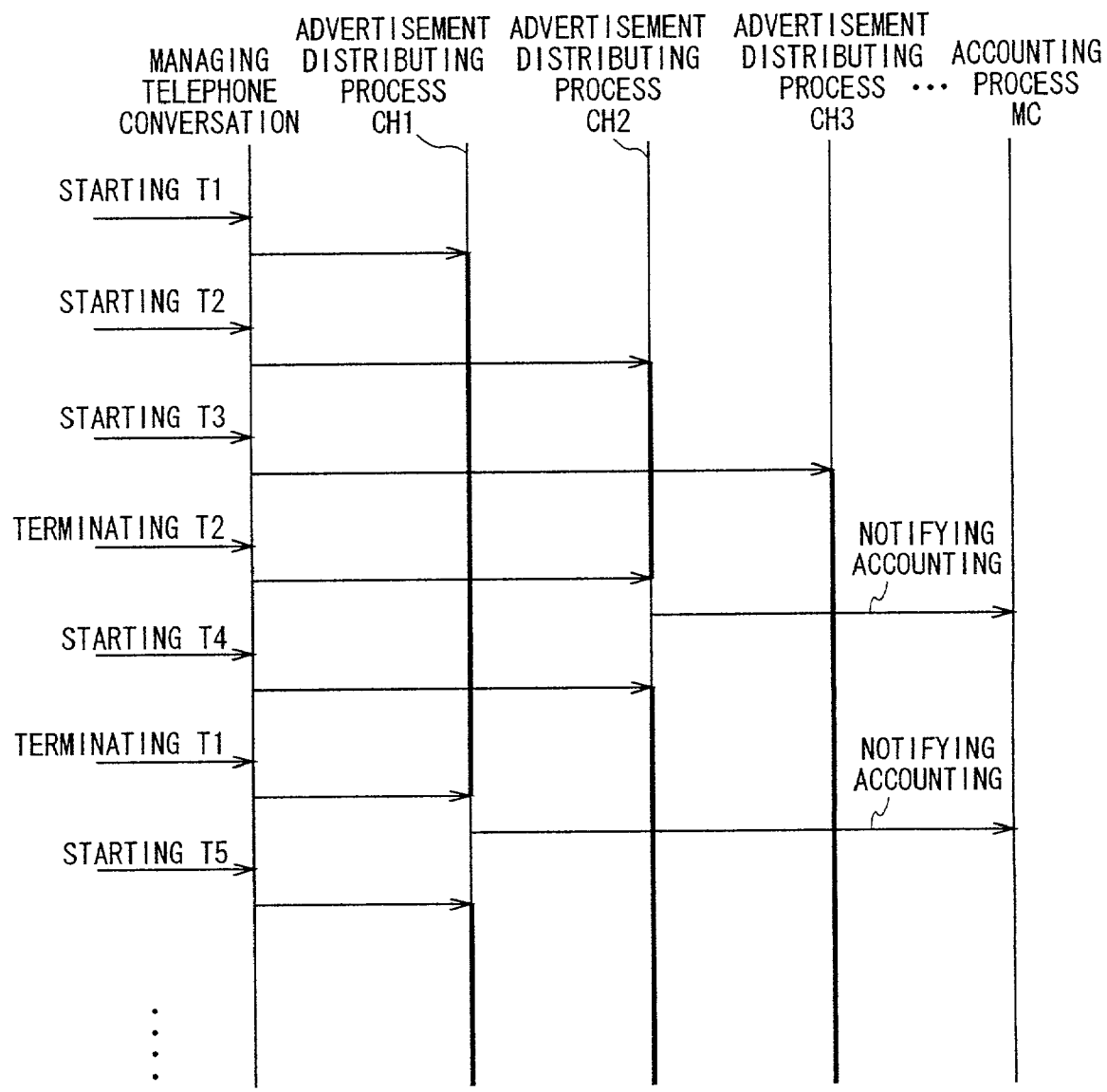
FIG. 7 is a schematic view for explanation of the flow of the distribution of advertisement information.

With the above mentioned configuration, the common carrier 5 manages the telephone conversation of a user in the communication system 1 as shown in FIG. 7. When it confirms that the first telephone conversation T1 is started, it starts the advertisement distributing process CH1 for the first telephone conversation T1. When the common carrier 5 confirms that the second telephone conversation T2 is started during the advertisement distributing process CH1, it starts the advertisement distributing process CH2 for the second telephone conversation T2.

When the common carrier 5 confirms the start of the third telephone conversation T3 during the advertisement distributing processes CH1 and CH2, it starts the advertisement distributing process CH3 for the third telephone conversation T3.

When the advertisement distributing process CH2 terminates during the advertisement distributing processes CH1 and CH3 by the termination of the second telephone conversation T2, the common carrier 5 performs the accounting process corresponding to the second telephone conversation T2 and the advertisement distributing process CH2.

When the common carrier 5 confirms the start of the fourth telephone conversation T4 during the advertisement distributing processes CH1 and CH3, it starts the advertisement distributing process CH2 for the fourth telephone conversation T4, and performs the accounting process corresponding the first telephone conversation T1 and the advertisement distributing process CH1 when the advertisement distributing process CH1 terminates by the termination of the first telephone conversation T1 during the advertisement distributing processes CH2 and CH3.

When the common carrier 5 confirms the start of the fifth telephone conversation T5 during the advertisement distributing processes CH2 and CH3, it starts the advertisement distributing process CH1 for the fifth telephone conversation T5. Afterwards, each time a telephone conversation is started, the common carrier 5 starts an advertisement distributing process, and performs a corresponding accounting process when the advertisement distributing process terminates by the termination of the telephone conversation.

As a result, in the communication system 1, in return for the distribution of advertisement information to the portable telephone terminal 2 and the telephones $1TL_1$ to $nTL_n$ during the telephone conversation of a user, the common carrier 5 discounts the rate of use of the portable telephone terminal 2 and the telephones $1TL_1$ to $nTL_n$ of the user by the amount set depending on the distributed advertisement information, thereby reducing the charge to the user, and effectively distributing advertisement information to users.

With the above mentioned configuration, when a call is issued from the portable telephone terminal 2 and the telephones $1TL_1$ to $nTL_n$, it is transmitted through a predetermined transmission line and the common carrier 5. As a result, in return for the distribution of advertisement information to the portable telephone terminal 2 and the telephones $1TL_1$ to $nTL_n$ during the telephone conversation, the common carrier 5 discounts the rate of use of the portable telephone terminal 2 and the telephones $1TL_1$ to $nTL_n$ by the amount set depending on the distributed advertisement information, thereby reducing the charge for use of the portable telephone terminal 2 and the telephones $1TL_1$ to $nTL_n$, and effectively distributing advertisement information to users. Thus, the communication system 1 can be realized with its convenience greatly improved.

(2) Second Embodiment (2-1) Configuration of Communication System

Figure 8:
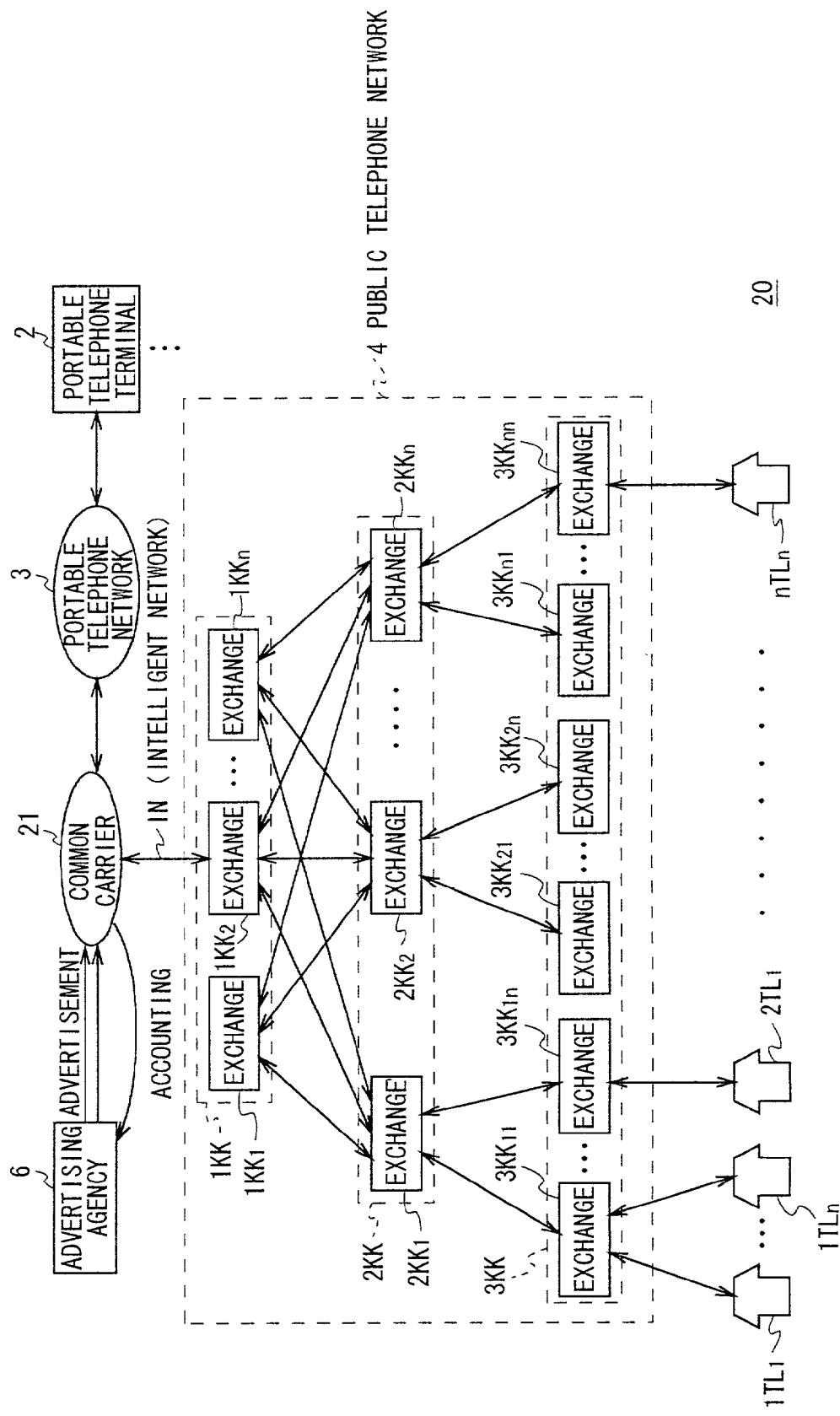
FIG. 8 is a block diagram showing the configuration of the communication system according to a second embodiment.

In FIG. 8 showing the same reference numeral assigned to a unit corresponding to the unit shown in FIG. 1, reference numeral 20 generally denotes a communication system according to the second embodiment of the present invention. The communication system 20 has the same configuration as the communication system 1 according to the first embodiment of the present invention except that the configuration of a common carrier 21 is different from the configuration of the common carrier 5 (FIG. 1).

(2-2) Configuration of Common Carrier

Figure 9:
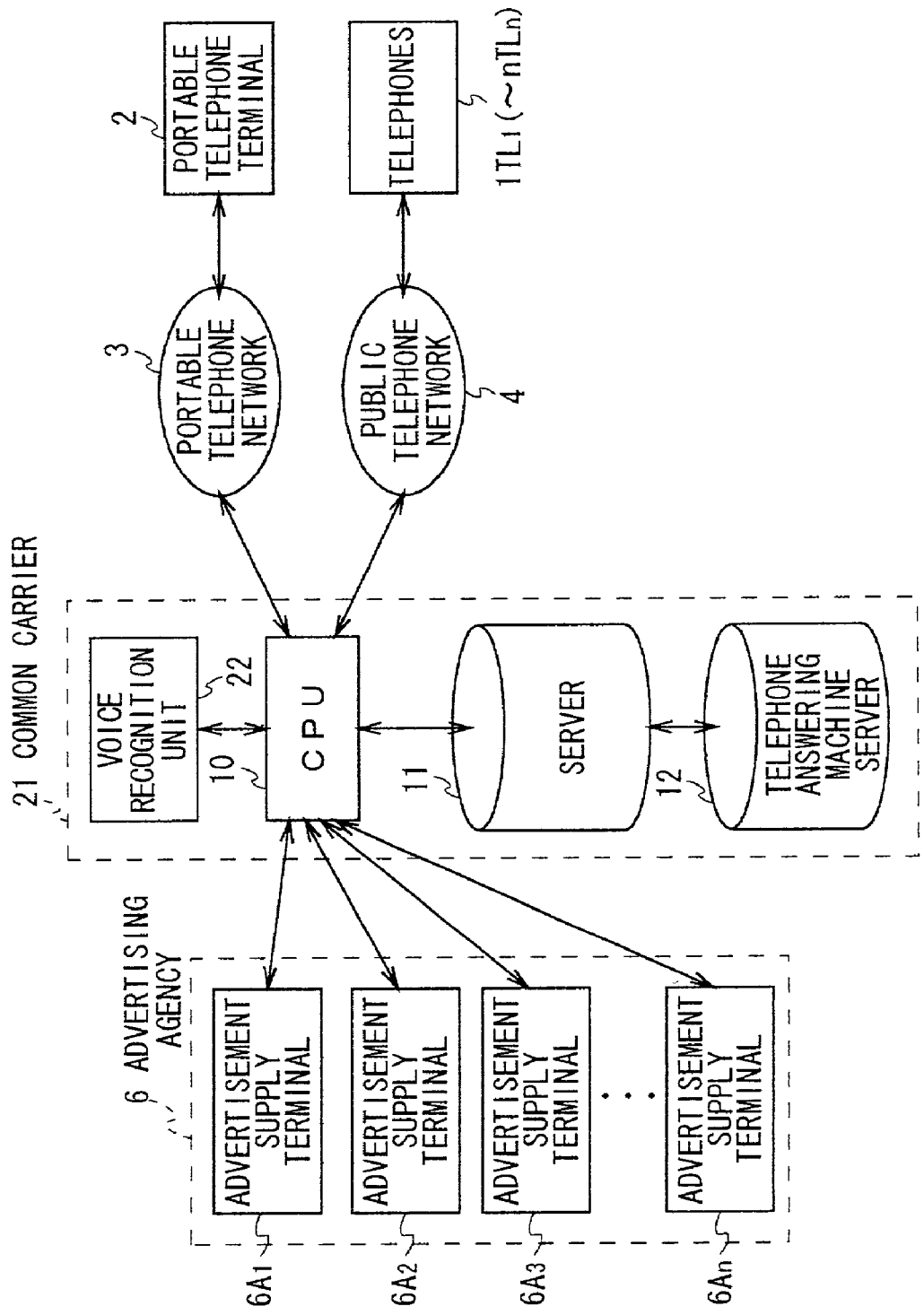
FIG. 9 is a block diagram of the configuration of the common carrier according to the second embodiment.

Practically, the common carrier 21 is the same in configuration as the common carrier 5 according to the first embodiment as shown in FIG. 9 in which the same reference numeral is assigned to a unit corresponding to the unit shown in FIG. 2 except that a voice recognition unit 22 is added to the configuration of the common carrier 5 (shown in FIG. 2), and the voice recognition unit 22 is interconnected with the CPU 10.

When a user starts telephone conversation with another user, the voice recognition unit 22 sequentially recognizes words in the telephone conversation under control of the CPU 10, picks up the recognized words as keywords, and generates keyword tables of the user and/or the other user (not shown in the attached drawings) corresponding to the keywords and the frequency of the keywords (that is, as keyword tables of the telephone conversation) separately or collectively based on the phone numbers of the transmitting side and the receiving side.

On the other hand, the server 11 stores in advance a keyword-category table TA1 and an advertisement-category table TA2 as shown in FIGS. 10 and 11, and the CPU 10 compares the keyword-category table TA1 with the keyword table generated by the voice recognition unit 22, and extracts an intermediate category and a large category.

Then, the CPU 10 specifies a predetermined number of intermediate and large categories in order from the highest frequency from among the extracted intermediate and large categories, selects advertisement information corresponding to the specified intermediate and large categories based on the advertisement-category table TA2 of the server 11, and distributes the selected information to the portable telephone terminal 2 and the telephones $1TL_1$ to $nTL_n$ of the user in telephone conversation through the corresponding portable telephone network 3 and public telephone network 4.

Thus, the communication system 20 can distribute the advertisement information based on the liking of a user by priority by the CPU 10 of the common carrier 21 selecting and distributing the advertisement information corresponding the intermediate and large categories specified based on the keyword picked up by the voice recognition unit 22.

(2-3) Voice Recognition Activating Procedure

Figure 12:
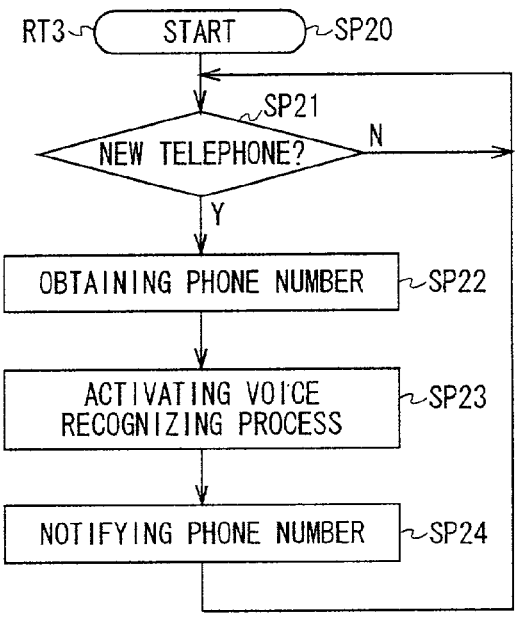
FIG. 12 is a flowchart for explanation of the voice recognition activating procedure.

Practically, in the communication system 20, the CPU 10 of the common carrier 21 is provided with a communication management unit (not shown in the attached drawings) in addition to the advertisement distributing unit (not shown in the attached drawings) and the accounting unit (not shown in the attached drawings), and the communication management unit starts a voice recognition activating procedure RT3 in step SP20 as shown in FIG. 12 when the communication system 20 is activated under control of the CPU 10, and activates the voice recognition unit 22 when a user calls up another user and starts telephone conversation between them.

The communication management unit is included in the application programs performed by the CPU 10 of the communication system 20. The voice recognition activating procedure RT3 described below is actually performed by the CPU 10.

That is, the communication management unit starts the voice recognition activating procedure RT3 in step SP20 when the communication system 20 is activated, enters a wait state until a call request is issued by transmitting the phone numbers of a transmitter and a receiver from the portable telephone terminal 2 or the telephones $1TL_1$ to $nTL_n$ of a user in step SP21, enters the next step SP22 when an acknowledgment result is obtained by receiving the call request from the portable telephone terminal 2 or the telephones $1TL_1$ to $nTL_n$, and obtains the phone numbers of the transmitter and the receiver transmitted by the call request.

Then, the communication management unit activates the voice recognition unit 22 by transmitting an activate instruction to the voice recognition unit 22 in the next step SP23, notifying in step SP24 the voice recognition unit 22 of the phone number of the transmitter and the receiver obtained in step SP22, and returns to step SP21.

Thus, the communication management unit sequentially repeats the loop in steps SP21-SP22-SP23-SP24 when a call request is issued from the portable telephone terminal 2 or the telephones $1TL_1$ to $nTL_n$ of a user, and activates the voice recognition unit 22 so that the telephone conversation can be voice-recognized.

(2-4) Voice Recognizing Procedure

Figure 13:
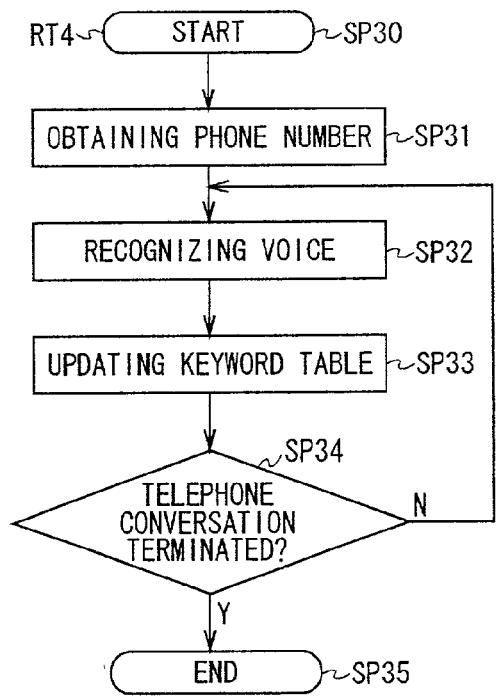
FIG. 13 is a flowchart for explanation of the voice recognizing procedure.

The voice recognition unit 22 of the communication system 20 starts the voice recognizing procedure RT4 as shown in FIG. 13 in step SP30 when it receives an activate instruction from the CPU 10, sequentially recognizes the words in the telephone conversation, and generates a keyword table by picking up the recognized words as keywords.

That is, the voice recognition unit 22 starts the voice recognizing procedure RT4 in step SP30 when it receives an activate instruction from the CPU 10, obtains phone numbers notified by the CPU 10 in step SP31, and passes to the next step SP32.

In step SP32, the voice recognition unit 22 sequentially recognizes the words in the telephone conversation of the users corresponding to the notified phone numbers, picks them up as keywords, passes to the next step SP33, and generates keyword tables depending on the keywords and their frequencies based on the notified phone numbers either separately for each user or collectively (that is, as the keyword tables of the telephone conversation).

Then, the voice recognition unit 22 passes to the next step SP34, determines whether or not the telephone conversation has terminated, returns to step SP32 when a negative result indicating that the telephone conversation has not terminated is obtained, sequentially repeats the loop in step SP32-SP33-SP34 until the acknowledgment result indicating that the telephone conversation has terminated is obtained in step SP34, and terminates the voice recognizing procedure RT4 in step SP35 when the acknowledgment result indicating that the telephone conversation has terminated is obtained in step SP34.

(2-5) Advertisement Distributing Procedure

Figure 14:
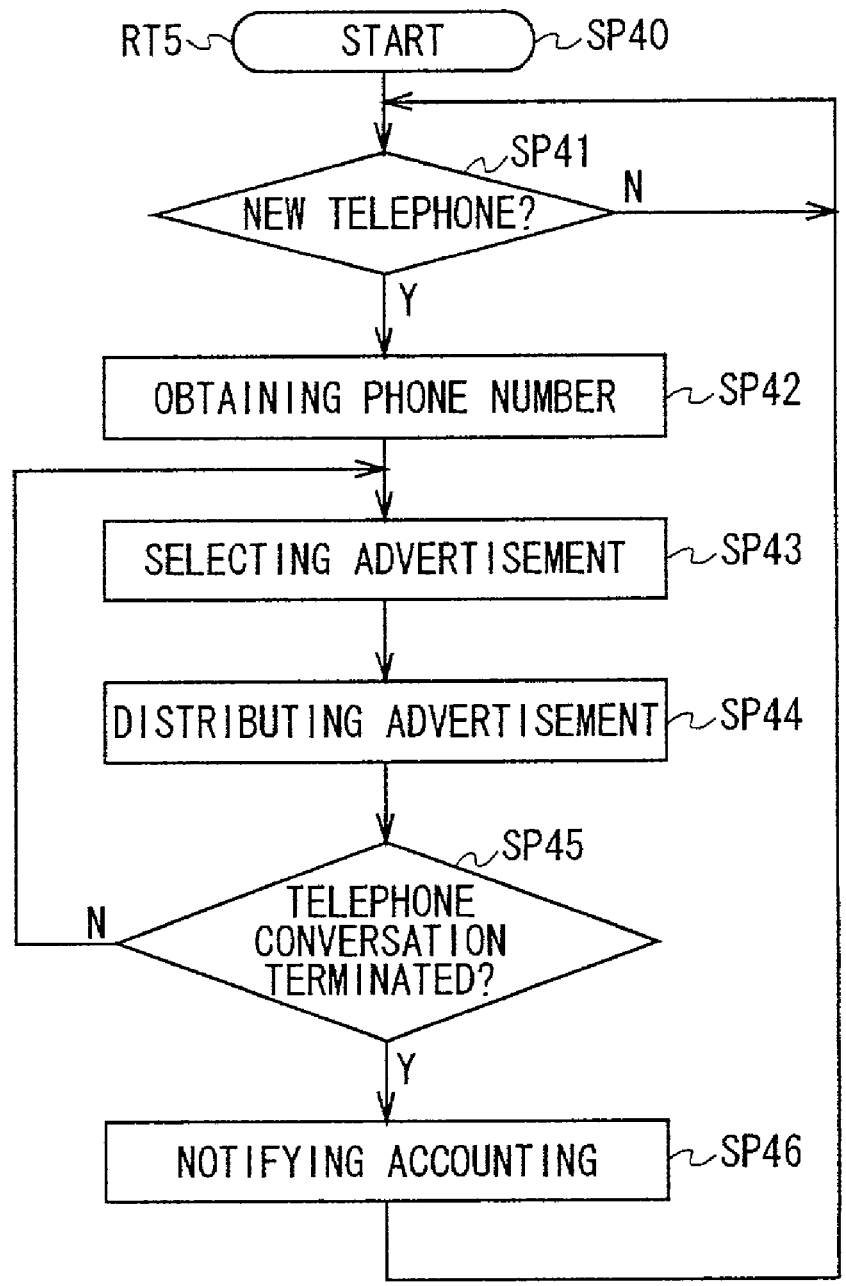
FIG. 14 is a flowchart for explanation of the advertisement distributing procedure.

On the other hand, as with the above mentioned communication management unit, the advertisement distributing unit of the CPU 10 of the common carrier 21 starts the advertisement distributing procedure RT5 as shown in FIG. 14 in step SP40 when the information transmission system 20 is activated under control of the CPU 10, and distributes advertisement information based on telephone-conversation of users at predetermined time intervals during the telephone conversation when the user starts the telephone conversation with another user on the phone.

The advertisement distributing unit is one of the application programs in the CPU 10 of the common carrier 21, and the advertisement distributing procedure RT5 described below is practically performed by the CPU 10.

That is, the advertisement distributing unit starts the advertisement distributing procedure RT5 in step SP40 when the information transmission system 20 is activated, waits for a call request issued by transmitting the phone numbers of a transmitter and a receiver from the portable telephone terminal 2 or the telephones $1TL_1$ to $nTL_n$ of a user in step SP41, enters the next step SP42 when an acknowledgment result can be obtained by issuing a call request through the portable telephone terminal 2 or the telephones $1TL_1$ to $nTL_n$, and obtains the phone numbers of the transmitter and the receiver transmitted at the call request.

Then, the advertisement distributing unit connects the telephone of the transmitter to the telephone of the receiver according to the phone numbers of the transmitter and the receiver obtained in step SP42, compares the keyword-category table TA1 stored in the server 11 with the keyword table generated by the voice recognition unit 22 according to the phone numbers of the transmitter and the receiver, and extracts the intermediate and large categories in step SP43.

Then, the advertisement distributing unit specifies a predetermined number of intermediate and large categories in order from the highest frequency from among the extracted intermediate and large categories, selects advertisement information corresponding to the specified intermediate and large categories based on the advertisement-category table TA2 of the server 11, distributes an advance announcement and the selected advertisement information at predetermined time intervals to the corresponding portable telephone terminal 2 and telephones $1TL_1$ to $nTL_n$ during the telephone conversation between the users in step SP44, and passes to the next step SP45.

The advertisement distributing unit determines in step SP45 whether or not the telephone conversation has terminated, returns to step SP43 when a negative result indicating that the telephone conversation has not terminated is received, and sequentially repeats the loop in step SP43-SP44-SP45 until an acknowledgment result indicating that the telephone conversation has terminated is obtained in step SP45.

When the acknowledgment result indicating that the telephone conversation has terminated is obtained in step SP45, the advertisement distributing unit notifies the accounting unit of the accounting data containing the distribution data based on the distribution state of the advertisement information during the telephone conversation, the phone numbers of the transmitter of the call, etc. in step SP46, and then returns to step SP41.

When the advertisement distributing unit receives a call request from the portable telephone terminal 2 or the telephones $1TL_1$ to $nTL_n$ of a user, it sequentially repeats the loop of step SP41-SP42-SP43-SP44-SP45-SP46, and distributes advertisement information based on the telephone conversation at predetermined time intervals to the corresponding portable telephone terminal 2 and the telephones $1TL_1$ to $nTL_n$ in telephone conversation.

(2-6) Operation and Effect of the Second Embodiment

Figure 15:
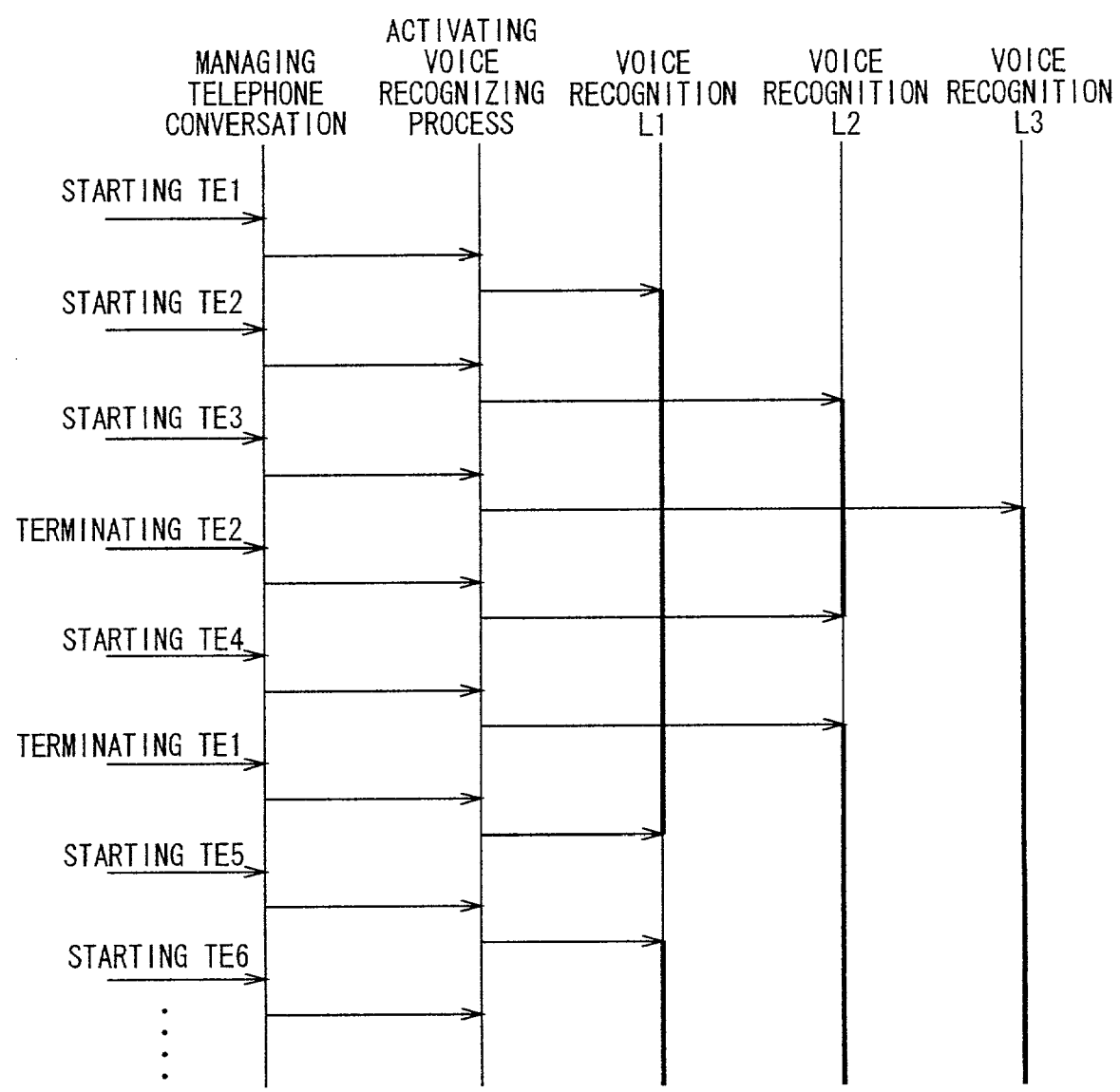
FIG. 15 is a schematic view of the flow of the voice recognizing procedure.

With the above mentioned configuration, in the communication system 20, the common carrier 21 manages the telephone conversation of users as shown in FIG. 15, issues an activate instruction to the voice recognition unit 22 when the start of the first telephone TE1 is confirmed, and starts the voice recognizing process of the resource L1 in the corresponding resources L1 to L3 when the voice recognizing process has, for example, three resources L1 to L3.

When the common carrier 21 confirms the start of the second telephone TE2 during the voice recognizing process of the resource L1, it issues an activate instruction to the voice recognition unit 22 corresponding to the second telephone TE2, and starts the voice recognizing process of the resource L2.

When the common carrier 21 confirms the start of the third telephone TE3 during the voice recognizing process of the resources L1 and L2, it issues an activate instruction to the voice recognition unit 22 corresponding to the third telephone TE3, and starts the voice recognizing process of the resource L3.

When the common carrier 21 confirms the termination of the second telephone TE2 during the voice recognizing process of the resources L1 and L3, it allows the voice recognition unit 22 to terminate the voice recognizing process of the resource L2 corresponding to the second telephone TE2. Thus, the resource L2 enters a free state.

When the common carrier 21 confirms the start of the fourth telephone TE4 in this state, it issues an activate instruction to the voice recognition unit 22 corresponding to the fourth telephone TE4, and starts the voice recognizing process of the resource L2.

When the common carrier 21 confirms the termination of the first telephone TE1 during the voice recognizing process of the resources L2 and L3, it allows the voice recognition unit 22 to terminate the voice recognizing process of the resource L1 corresponding to the first telephone TE1. Thus, the resource L1 enters a free state.

When the common carrier 21 confirms the start of the fifth telephone TE5 in this state, it issues an activate instruction to the voice recognition unit 22 corresponding to the fifth telephone TE5, and starts the voice recognizing process of the resource L1.

If the sixth telephone TE6 is started when these resources L1 to L3 are being used, and the common carrier 21 issues an activate instruction corresponding to the sixth telephone TE6, then the voice recognition unit 22 waits until any of the resources L1 to L3 becomes free without performing the voice recognizing process corresponding to the sixth telephone TE6 because all resources L1 to L3 are being used.

As a result, in the communication system 20, the common carrier 21 voice-recognizes the telephone conversation of users, sequentially picks up keywords, and extracts categories depending on the keywords, thereby selecting advertisement information corresponding to the categories. Thus the communication system 20 can distribute to the user the advertisement information suitable for the preference of the user.

With the configuration, the voice recognition unit 22 is provided for the common carrier 21, a keyword is extracted by sequentially voice-recognizing the words in the telephone conversation of users, and advertisement information is selected based on the categories corresponding to the keywords, thereby distributing the advertisement information corresponding to the liking of a user to the portable telephone terminal 2 and the telephones $1TL_1$ to $nTL_n$ of the user, and more effectively distributing the advertisement information to the user.

(3) Third Embodiment (3-1) Configuration of Communication System

Figure 16:
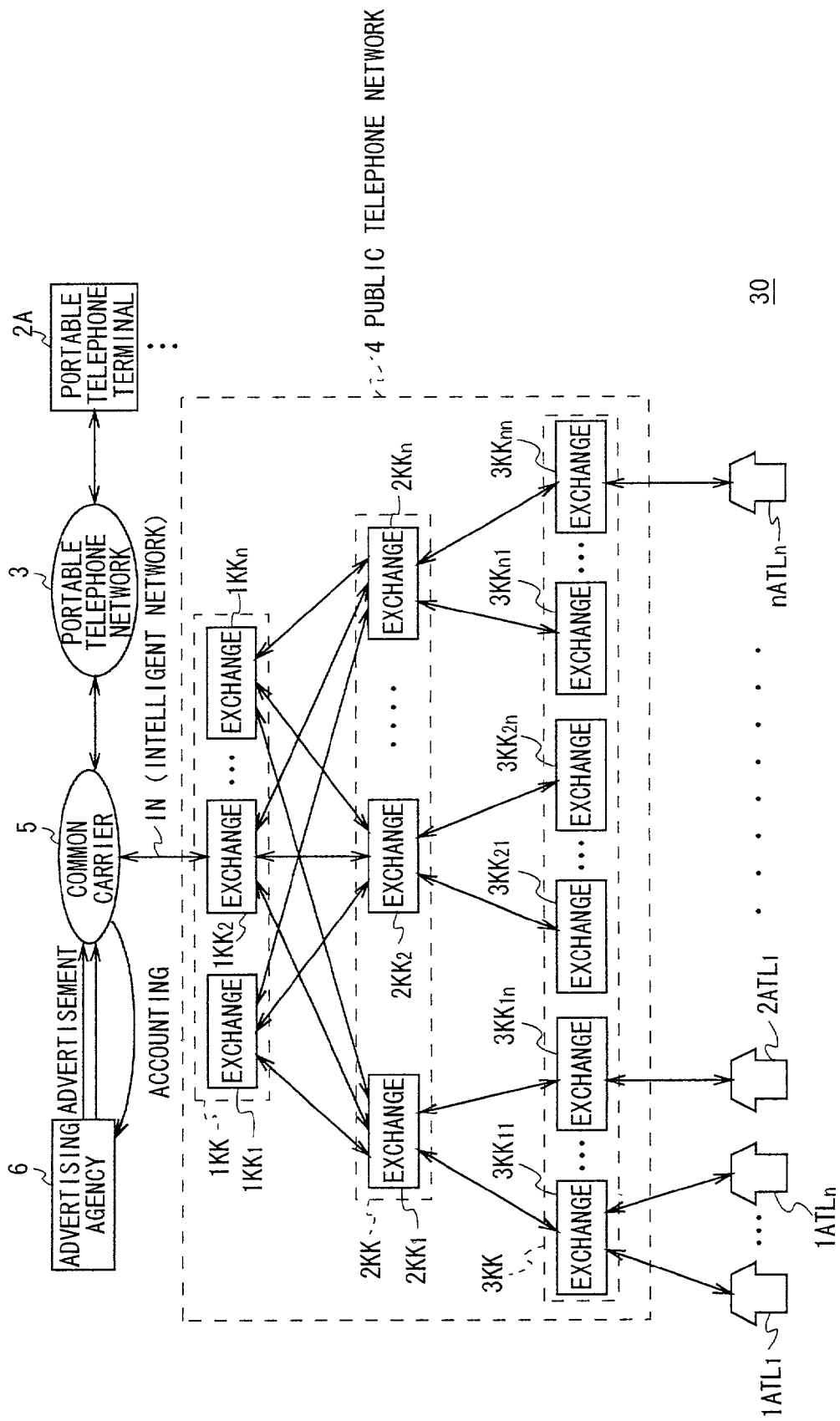
FIG. 16 is a block diagram of the configuration of the communication system according to a third embodiment of the present invention.

In FIG. 16 in which part corresponding to those in FIG. 1 are assigned the same reference numerals as in FIG. 1, reference numeral 30 denotes a communication system according to the third embodiment, and the system has the same configuration as the communication system 1 according to the first embodiment except that the portable telephone terminal 2A and the telephones $1ATL_1$ to $nATL_n$ are respectively different from the portable telephone terminal 2 and the telephones $1TL_1$ to $nTL_n$ (shown in FIG. 1).

Actually, the portable telephone terminal 2A and the telephones $1ATL_1$ to $nATL_n$ are provided with a confirm command (not shown) notifying as confirmation data that the advertisement information distributed by the common carrier 5 has been completely viewed and/or heard.

Figure 17:
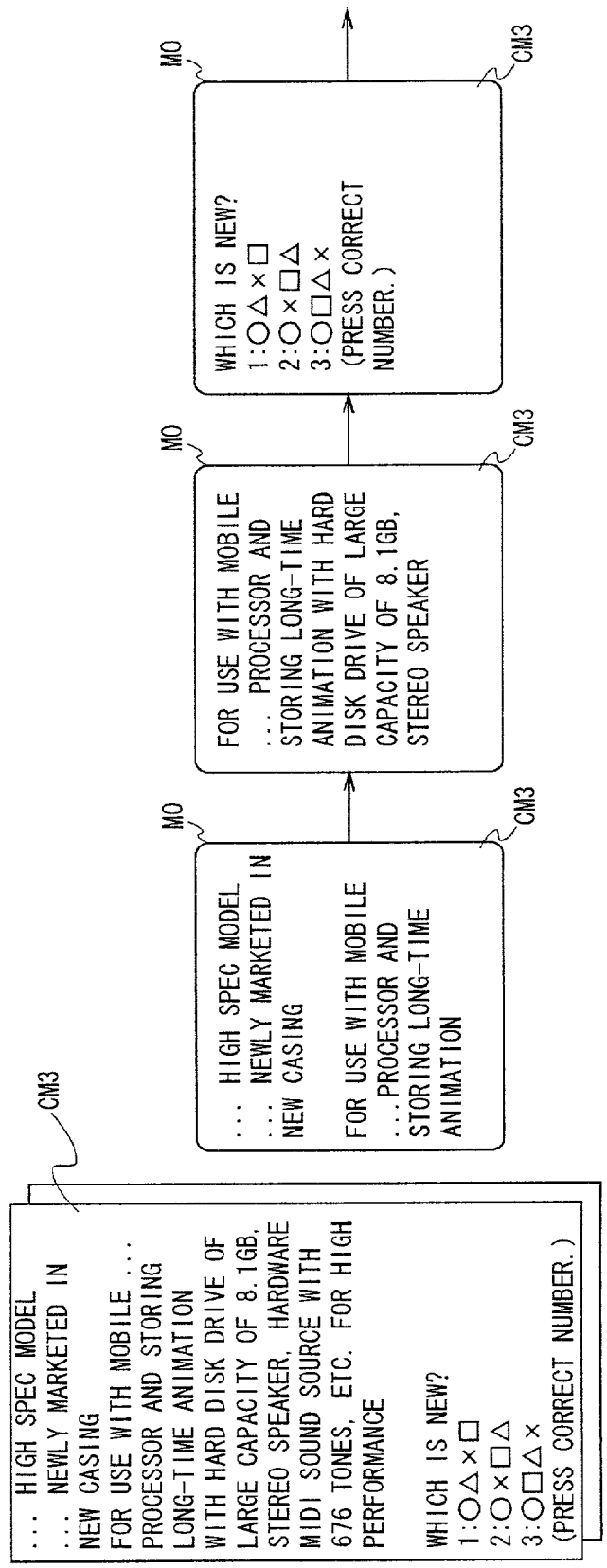
FIGS. 17A to 17D are schematic views for explanation of the process of distributing advertisement information from a common carrier.

When the common carrier 5 distributes an advertisement CM3 according to the advertisement information containing text data at the end of which a view confirmation quiz, etc. as shown in FIG. 17A is added to the portable telephone terminal 2A and the telephones $1ATL_1$ to $nATL_n$, the corresponding advertisement CM3 is displayed on the display unit MO, and is sequentially viewed by a user in the order of FIGS. 17B and 17C.

When a user answers the quiz corresponding to the contents of the advertisement added at the end of the advertisement CM3 displayed on the display unit MO as shown in FIG. 17D, the portable telephone terminal 2A and the telephones $1ATL_1$ to $nATL_n$ transmit the confirmation data to the common carrier 5 based on a predetermined confirm command, thereby notifying that the user has completely viewed the advertisement information.

Thus, the CPU 10 of the common carrier 5 can confirm the user has completely viewed the distributed advertisement information by receiving the confirmation data transmitted from the portable telephone terminal 2A and the telephones $1ATL_1$ to $nATL_n$, counts the number of pieces of distributed advertisement information for the received conformation data, and updates the distribution record stored in the server 11.

Then, the CPU 10 reads from the server 11 a command to delete the advertisement information distributed to the portable telephone terminal 2A and the telephones $1ATL_1$ to $nATL_n$ from the display unit MO of the portable telephone terminal 2A and the telephones $1ATL_1$ to $nATL_n$, and transmits it to the portable telephone terminal 2A and the telephones $1ATL_1$ to $nATL_n$.

Then, the CPU 10 compares the number of pieces of distributed advertisement information based on the distribution record of the advertisement information stored in the server 11 with the number of pieces of distributed advertisement information set in the contract between the common carrier 5 and the advertising agency 6 (hereinafter referred to as the number of pieces under contract), terminates the distribution of the advertisement information and starts the distribution of new advertisement information to specified or all users if the number of pieces of distributed advertisement information has reached the number of pieces under contract, and continues distributing the advertisement information to specified or all users until the number of pieces of distributed advertisement information reaches the number of pieces under contract if the number of pieces of distributed advertisement information has not reached the number of pieces under contract.

Thus, in a communication system 30, the common carrier 5 can set the discount condition for a corresponding user depending on the confirmation situation of the advertisement information of the user, and can also set a discount amount depending on the number of pieces of distributed advertisement information.

(3-2) Advertisement Distribution Managing Procedure

Actually, in the communication system 30, the CPU 10 of the common carrier 5 is provided with an advertisement distribution managing unit (not shown in the attached drawings). The advertisement distribution managing unit starts the advertisement distribution managing procedure RT6 as shown in FIG. 18 in step SP50 when the advertisement information is distributed by the advertisement distributing unit to the portable telephone terminal 2A and the telephones $1ATL_1$ to $nATL_n$ of the user under control of the CPU 10, and manages the process of distributing the advertisement information until the number of pieces of distributed advertisement information reaches the number of pieces under contract.

The advertisement distribution managing unit is included in the application programs performed by the CPU 10 of the common carrier 5, and the advertisement distribution managing procedure RT6 described below is actually performed by the CPU 10.

Figure 18:
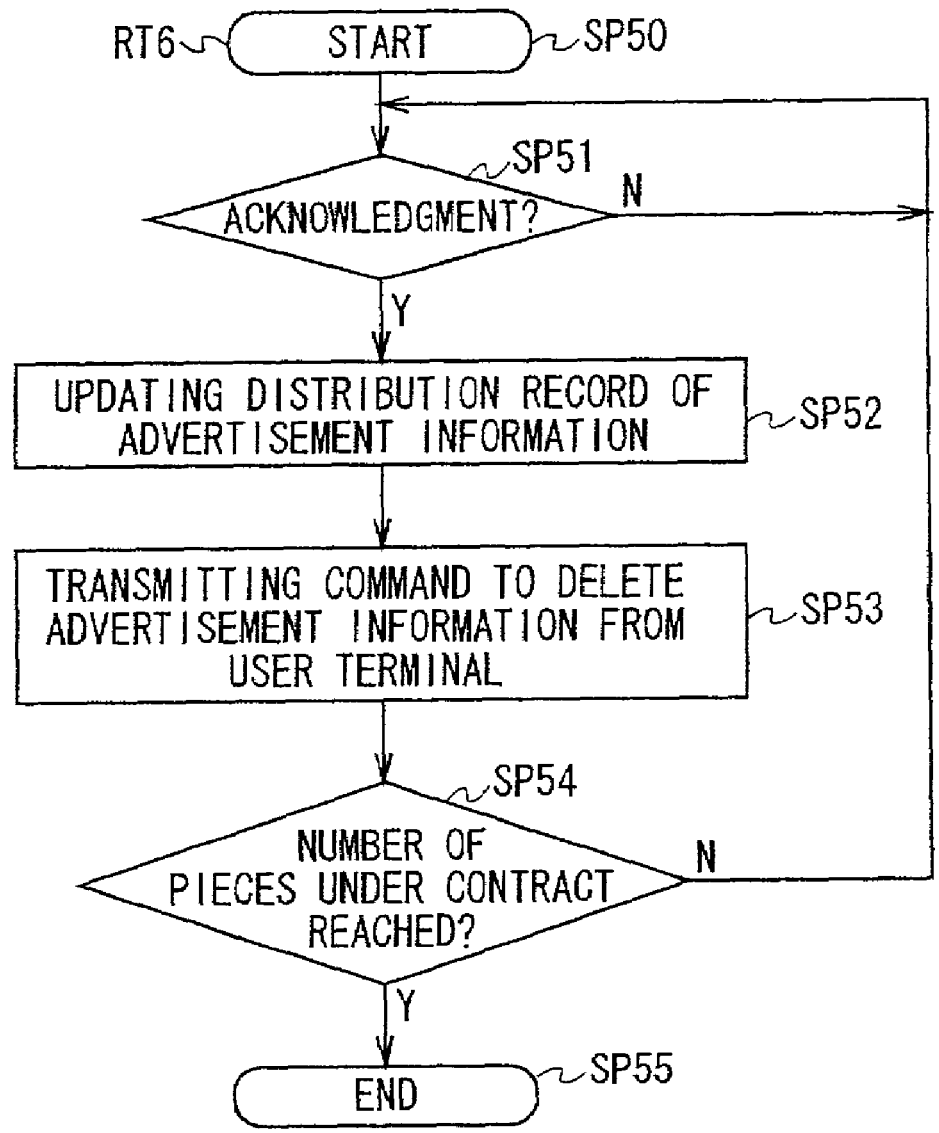
FIG. 18 is a flowchart for explanation of the advertisement distribution managing procedure.

That is, the advertisement distribution managing unit starts the advertisement distribution managing procedure RT6 as shown in FIG. 18 in step SP50 when advertisement information is distributed by the advertisement distributing unit to the portable telephone terminal 2A and the telephones $1ATL_1$ to $nATL_n$ of the user, and waits for a confirmation notification indicating that the advertisement information distributed to the portable telephone terminal 2A and/or the telephones $1ATL_1$ to $1TL_n$ has been viewed or heard by the user by transmitting the confirmation data from the portable telephone terminal 2A and the telephones $1ATL_1$ to $nATL_n$ in step SP51.

When an acknowledgment result is obtained in step SP51 by receiving a confirmation notification from the portable telephone terminal 2A and the telephones $1ATL_1$ to $nATL_n$, the advertisement distribution managing unit counts the number of pieces of distributed advertisement information stored in the server 11 by the number of confirmation notifications and updates the distribution record stored in the server 11 in step SP52, and passes to the next step SP53.

In step SP53, the advertisement distribution managing unit reads from the server 11 a command to delete the advertisement information distributed to the portable telephone terminal 2A and the telephones $1ATL_1$ to $nATL_n$ of the user from the display unit MO of the portable telephone terminal 2A and the telephones $1ATL_1$ to $nATL_n$, and transmits it to the portable telephone terminal 2A and the telephones $1ATL_1$ to $nATL_n$.

Then, the advertisement distribution managing unit determines in step SP54 whether or not the number of pieces of distributed advertisement information according to the distribution record has reached the number of pieces of the advertisement information under contract, returns to step SP52 when a negative result is obtained that the number of pieces of distributed advertisement information has not reached the number of pieces under contract, and waits for a confirmation notification from the portable telephone terminal 2A and the telephones $1ATL_1$ to $nATL_n$.

Then, the advertisement distribution managing unit sequentially repeats the loop of steps SP51-SP52-SP53-SP54 until an acknowledgment result is obtained by the number of pieces of distributed advertisement information reaching the number of pieces under contract in step SP54. When an acknowledgment result is obtained in step SP54, control is passed to step SP55, and the advertisement distribution managing procedure RT6 terminates.

(3-3) Operation and Effect of the Third Embodiment

With the above mentioned configuration in the communication system 30, after the user has completely viewed and/or heard the advertisement information distributed to the portable telephone terminal 2A and telephones $1ATL_1$ to $nATL_n$, a confirmation notification of the advertisement information is issued to the common carrier 5 based on the conformation command set in advance in the portable telephone terminal 2A and the telephones $1ATL_1$ to $nATL_n$.

Then, the common carrier 5 updates the distribution record of the advertisement information, distributes a command to delete the advertisement information to the portable telephone terminal 2A and the telephones $1ATL_1$ to $nATL_n$, and distributes the advertisement information to specified users or all users until the number of pieces under contract is reached according to the distribution record of the advertisement information.

As a result, in the communication system 30, the common carrier 5 can set the discount condition for the user depending on the confirmation situation of the advertisement information of the user, and can also set the discount amount corresponding to the number of pieces of distributed advertisement information.

With the above mentioned configuration, in the communication system 30, if a user notifies the common carrier 5 of the confirmation of the advertisement information after viewing and/or hearing the distributed advertisement information based on a confirm command predetermined in the portable telephone terminal 2A and the telephones $1ATL_1$ to $nATL_n$, then the common carrier 5 updates the distribution record of the advertisement information, distributes a command to delete the advertisement information to the portable telephone terminal 2 and the telephones $1ATL_1$ to $nATL_n$ of the user, and distributes the advertisement information to specific or all users until the number of pieces of the advertisement information under contract is reached based on the distribution record of the advertisement information, thereby allowing the common carrier 5 to set the discount condition for the user corresponding to the confirmation situation of the advertisement information of the user, and realizing the communication system 30 capable of furthermore improving the convenience.

(4) Fourth Embodiment (4-1) Configuration of Communication System

Figure 19:
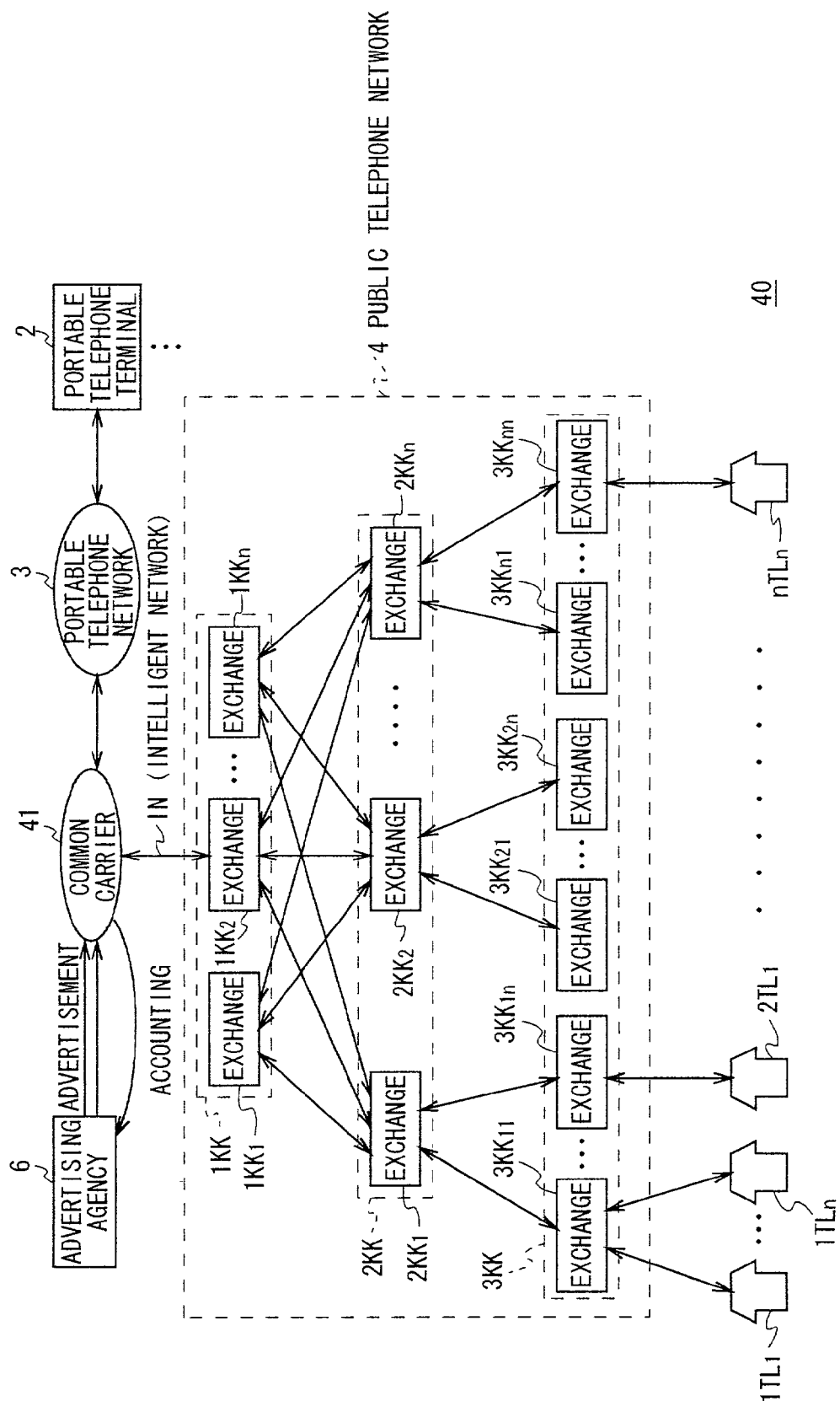
FIG. 19 is a block diagram of the configuration of the communication system according to a fourth embodiment of the present invention.

In FIG. 19 in which parts corresponding to those in FIG. 1 are assigned the same reference numerals as in FIG. 1, reference numeral 40 denotes the communication system according to the fourth embodiment, and is the same in configuration as the communication system 1 according to the first embodiment except that the configuration of a common carrier 41 is different from that of the common carrier 5 (FIG. 1).

(4-2) Configuration of Common Carrier

Figure 20:
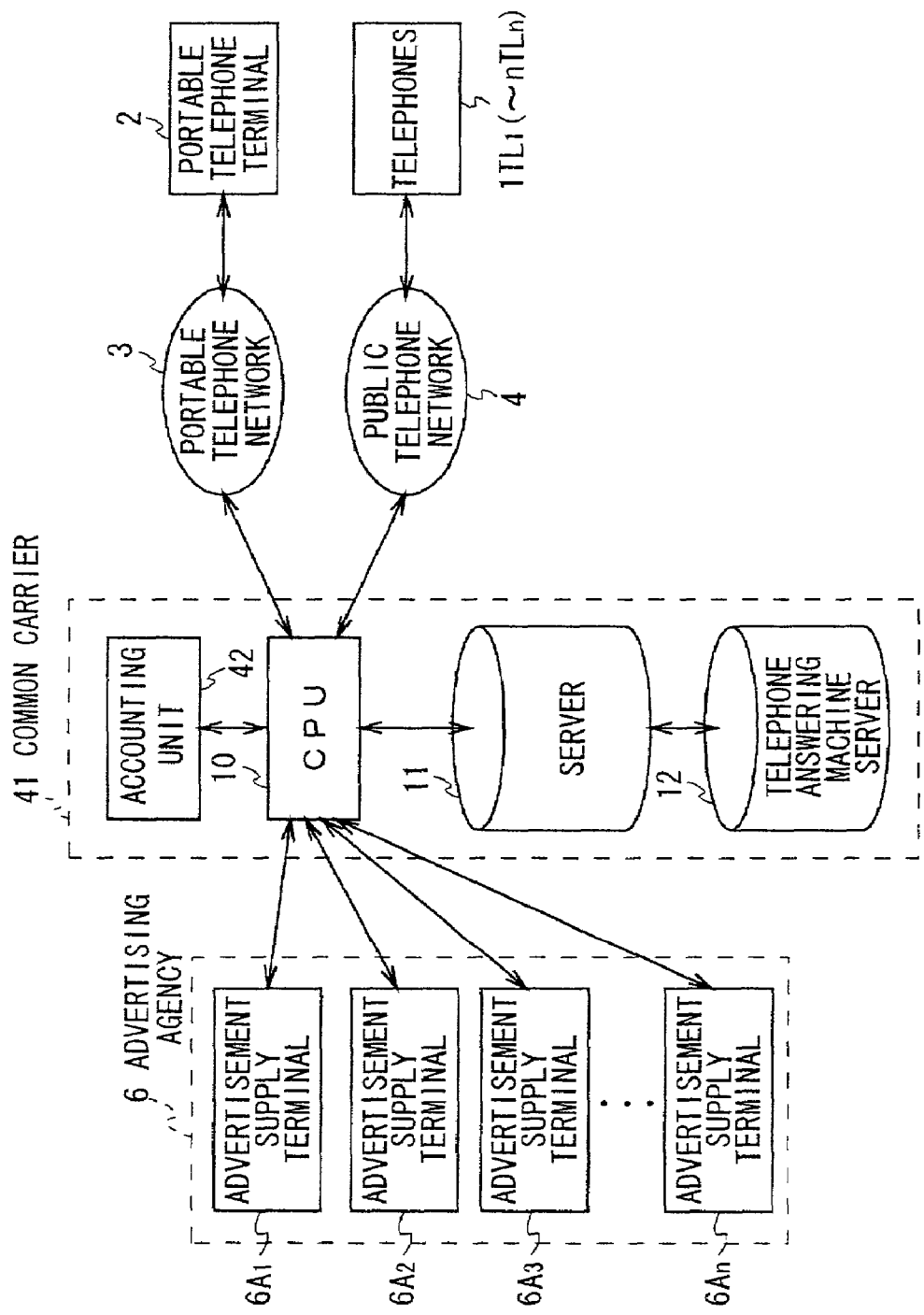
FIG. 20 is a block diagram of the configuration of the common carrier according to the fourth embodiment of the present invention.

As shown in FIG. 20 in which parts corresponding to those in FIG. 2 are assigned the same reference numerals as in FIG. 2, the common carrier 41 is actually the same as the common carrier 5 according to the first embodiment except that an accounting unit 42 is provided in addition to the configuration of the common carrier 5 (shown in FIG. 2) for interconnection with the CPU 10, a predetermined point (hereinafter referred to as an advertisement point) arbitrarily set for the advertisement information to be distributed to the portable telephone terminal 2 and the telephones $1TL_1$ to $nTL_n$ of the user is added, and a discount rate table DT containing fees set corresponding to the advertisement points such as a contract amount fee, a basic fee, a telephone conversation fee, etc. as shown in FIG. 21, and an advertisement point table (not shown in the attached drawings) containing obtained points for each user corresponding to the distribution history of advertisement information are stored in advance in the server 11.

The accounting unit 42 reads the discount rate table DT and the advertisement point table stored in advance in the server 11, computes the discount rate for each user based on the discount rate table and the advertisement point table, and charges the rate to each user based on the computation result.

At this time, a point of any value is set for each piece of advertisement information depending on the distribution situation and the contents. For example, the point of the advertisement information considered to have the contents significant for the user (matching the liking of the user) is assigned a low point while the opposite advertisement information is assigned a high point. Simultaneously, the discount amount for the user corresponding to the advertisement point is set to increase with an increasing advertisement point proportional to an advertisement point.

Thus, in the information communication system 40, if the common carrier 41 is notified under control of the CPU 10 that a user has completely confirmed the distributed advertisement information, then it updates the advertisement point table for the user stored in the server 11, and the discount rate computed by the accounting unit 42 based on the advertisement point table and the discount rate table DT corresponding to the point value of the distributed advertisement information is reduced from the total rate charged to the user.

(4-3) Operation and Effect According to the Fourth Embodiment

With the above mentioned configuration, in the communication system 40, the common carrier 41 assigns in advance any advertisement point to advertisement information to be distributed, the accounting unit 42 computes the discount amount for each user based on the discount rate table DT and the advertisement point table of each user stored in advance in the server 11 under control of the CPU 10, and charges the rate to each user based on the computation result.

As a result, in the communication system 40, the charge to each user can be reduced by the discount amount corresponding to the point value of the advertisement information distributed by the common carrier 41.

With the above mentioned configuration, the accounting unit 42 is provided for the common carrier 41, an optional advertisement point is added to advertisement information to be distributed in advance, the server 11 stores the discount rate table DT and the advertisement point table of each user, the discount amount is computed for each user based on the discount rate table DT and the advertisement point table for each user under control of the CPU 10, and each user is charged based on the computation result, thereby reducing the rate for each user by the discount amount corresponding the point value of the advertisement information distributed by the common carrier 41, and realizing the communication system 40 capable of furthermore improving its convenience.

(5) Other Embodiments

According to the above mentioned embodiments, advertisement information is distributed to the portable telephone terminal 2, the portable telephone terminal 2A, and the telephones $1TL_1$ to $nTL_n$ and $1ATL_1$ to $nATL_n$ by temporarily suspending the telephone conversation. However, the present invention is not limited to this application, but the advertisement information can also be distributed to the portable telephone terminal 2, the portable telephone terminal 2A, and the telephones $1TL_1$ to $nTL_n$ and $1ATL_1$ to $nATL_n$ in the state other than in telephone conversation such as in, for example, a call wait state, etc. Furthermore, for example, a musical advertisement can be distributed as a background music (BGM) during telephone conversation of users without suspending the telephone conversation, and advertisement information can be distributed to a telephone answering machine if a user subscribes to a telephone answering service.

Figure 22:
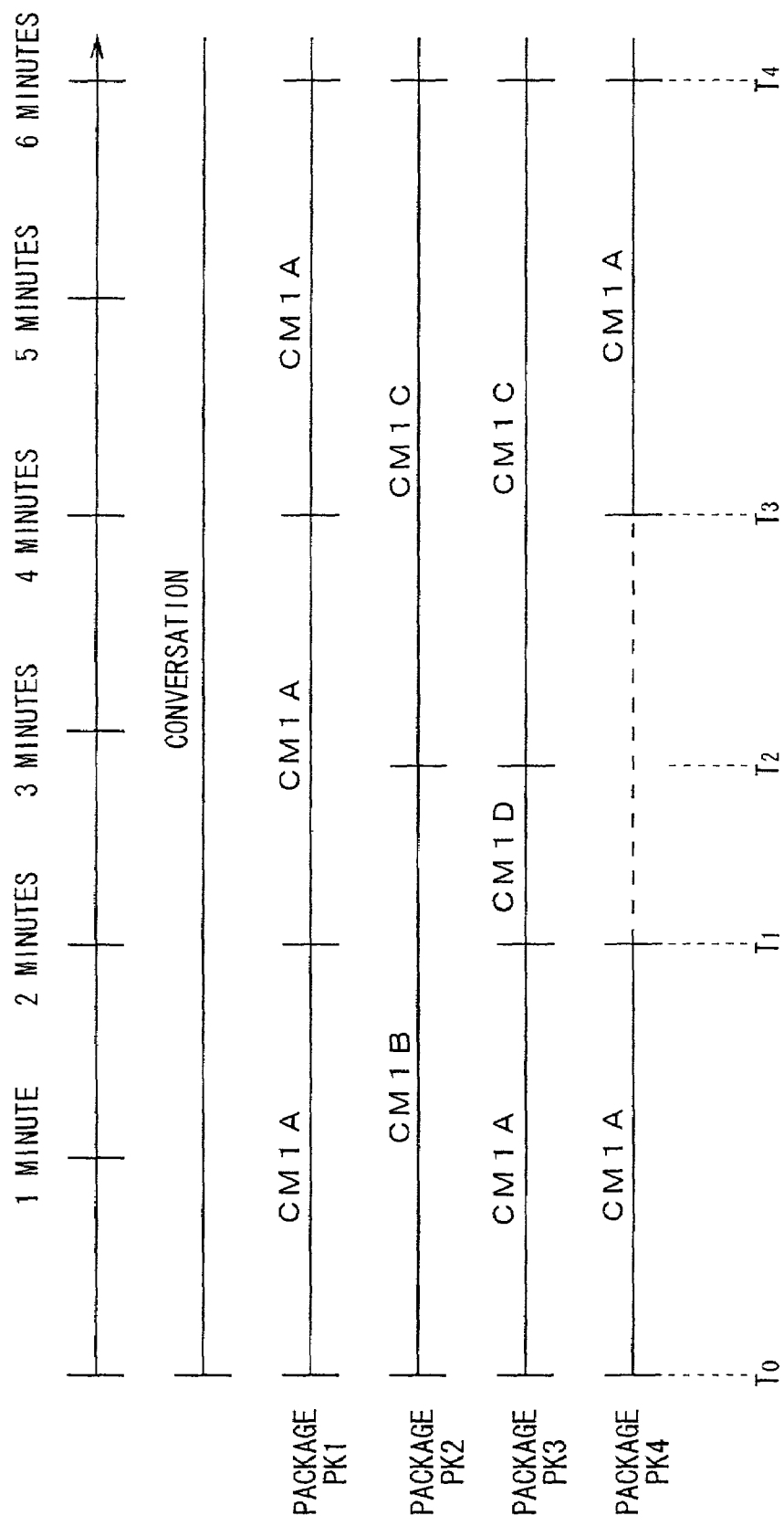
FIG. 22 is a schematic view for explanation of the flow of distributing BGM as advertisement information.

In this case, the service can be provided free of charge in return for the distribution of advertisement information to the telephone answering machine, and the advertisement information as the BGM can be distributed in a package PK1 for repeating an advertisement CM1A according to the advertisement information having the same contents, a package PK2 obtained by combining the advertisements CM1B and CM1C according to the advertisement information having different contents and the same lengths, a package PK3 obtained by combining the advertisements CM1A CM1D, and CM1C according to the advertisement information having different contents and lengths, a package PK4 providing a portion of only normal conversation for a predetermined time between the advertisements CM1As (in the period from time point T1 to time point T3) as shown in FIG. 22.

Figure 23:
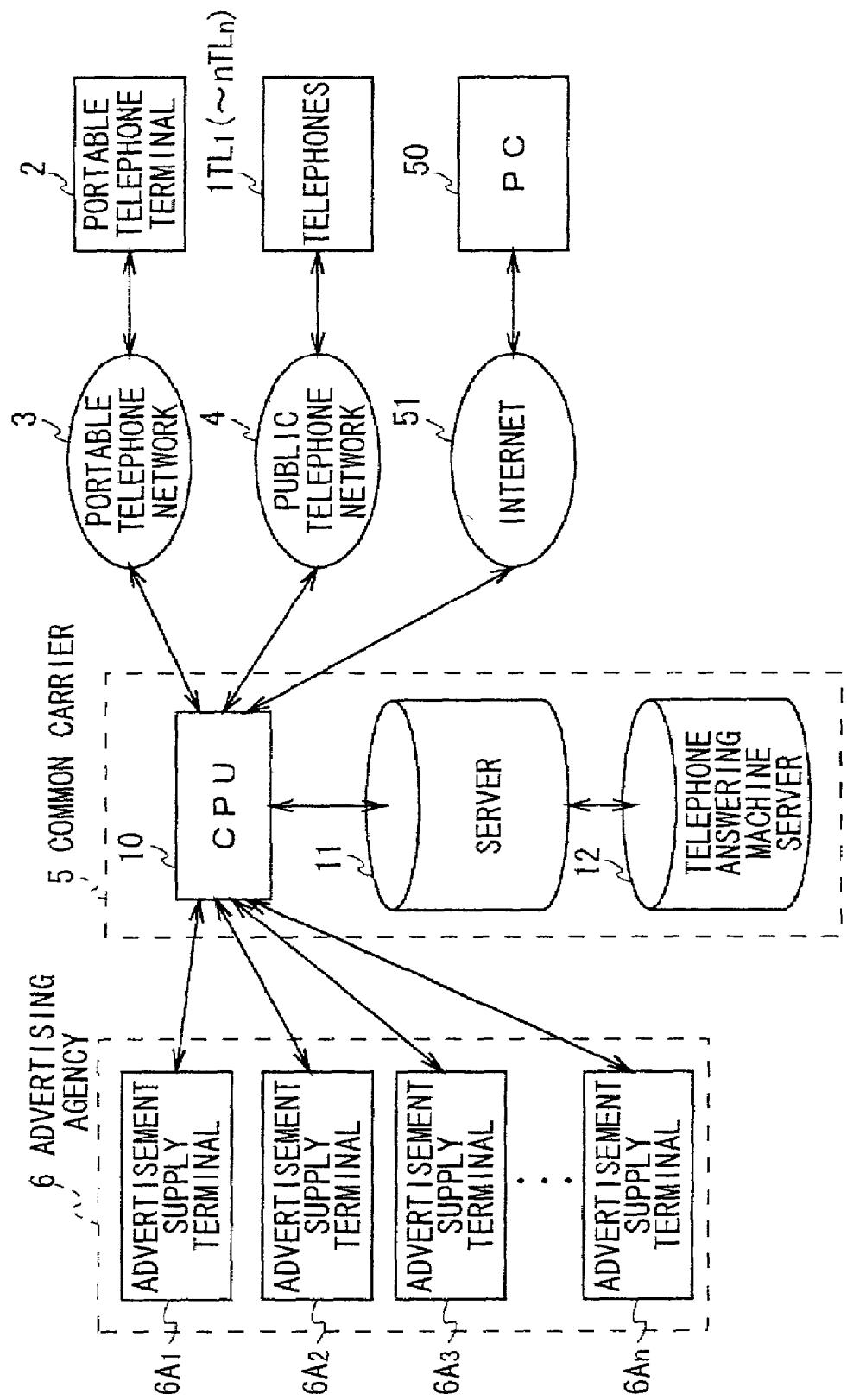
FIG. 23 is a block diagram for explanation of the connection between the common carrier and a user according to another embodiment of the present invention.

In addition, for example, when a user has a personal computer 50 as shown in FIG. 23, the personal computer 50 is interconnected with the CPU 10 of the common carrier 5 through Internet 51 so that the common carrier 5 can distribute advertisement information to the personal computer 50. The method of distributing the advertisement information can be any of the various other distributing methods. In this example, the common carrier 5 can be the common carriers 21 and 41.

According to the above mentioned second embodiment, the common carrier 21 uses the voice recognition unit 22 to select the advertisement information according to the category corresponding to the keyword extracted from the telephone conversation between users as a method of selecting distributed advertisement information. However, the present invention is not limited to this application. For example, the portable telephone terminal 2 and the telephones $1TL_1$ to $nTL_n$ contain voice recognition means to extract a category and notify the common carrier 5 of the result, thereby securing the privacy of the users in the telephone conversation.

In addition, the a phone number-category table TA3 as shown in FIG. 24 can be stored in advance in the server 11 to select advertisement information according to a category extracted based on the phone number-category table TA3 and the call history of a user, and select advertisement information corresponding to action patterns of a user as shown in FIG. 25.

In this case, a global positioning system (GPS) can be built in or provided for the portable telephone terminal 2 of a user as a position detection means to detect the position of the user, select advertisement information corresponding the position of the user, and distribute the information, thereby allowing the user to obtain the advertisement information in real time corresponding to the position of the user.

Figure 26:
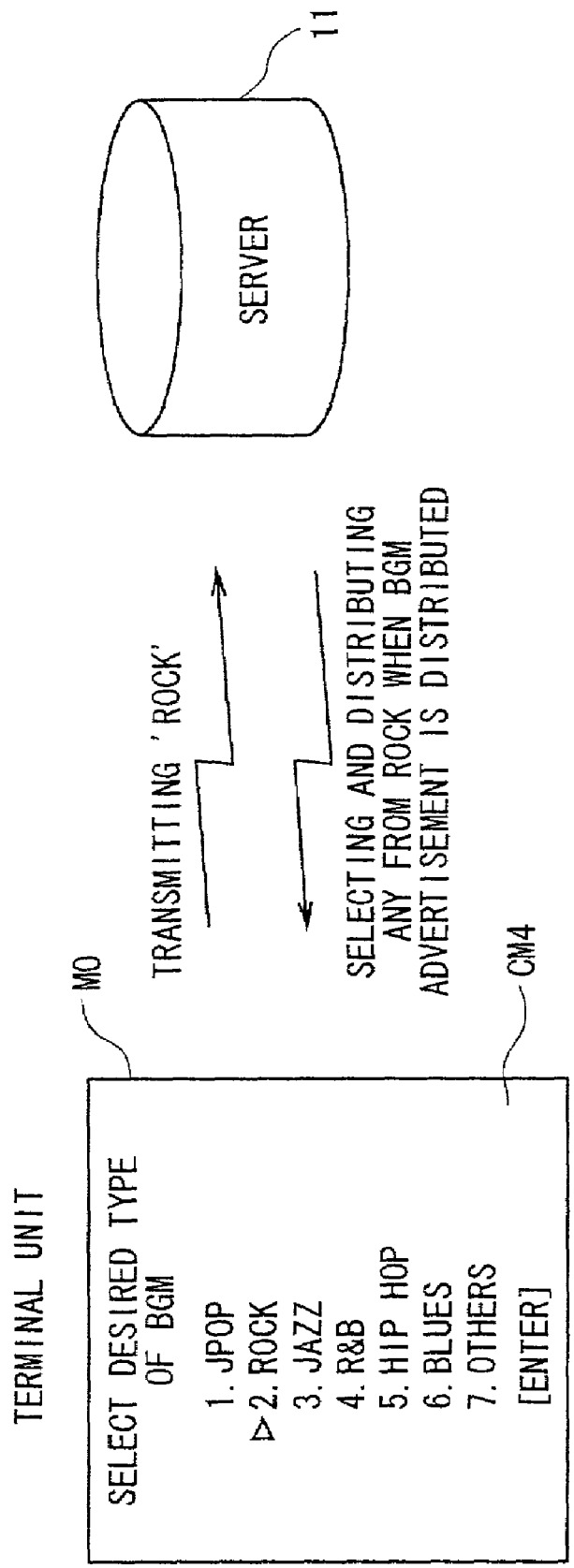
FIG. 26 is a schematic view for explanation of the flow of specifying a BGM advertisement category.

It is also possible that a user selects advertisement information at the time of subscription, selects advertisement information using a personal computer through Internet, and for example, as shown in FIG. 26, selects advertisement information on the monitor MO of the portable telephone terminal 2 and the telephones $1TL_1$ to $1TL_n$. Many other methods can also be applied as a method of selecting advertisement information to be distributed.

Furthermore, according to the third embodiment, as a method of issuing an acknowledgment by a user of distributed advertisement information, a quiz is added at the end of advertisement information, and a user answers the quiz as an acknowledgment. However, the present invention is not limited to this application. For example, a user can return a keyword, a predetermined identification information (ID) incorporated into advertisement information, etc. as an acknowledgment. That is, other methods can be used only if they can inform that the user has completely viewed or heard the distributed advertisement information.

According to the above mentioned fourth embodiment, a point is arbitrarily set for advertisement information to-be distributed as a discount method, and the accounting unit 42 charges a rate to a user based on a discount rate set corresponding to the advertisement point. However, the present invention is not limited to this application. For example, when a rate exceeds the telephone conversation rate for a month as set at the time of subscription of the user, the distribution of the advertisement information corresponding to the amount can be requested to discount the amount from the rate for the month, and to discount the amount from the rate for the next month. Furthermore, a user can request the distribution of the advertisement information corresponding to the amount to be discounted. That is, other discounting methods can be used only if the rate can be reduced for the user.

Figure 27:
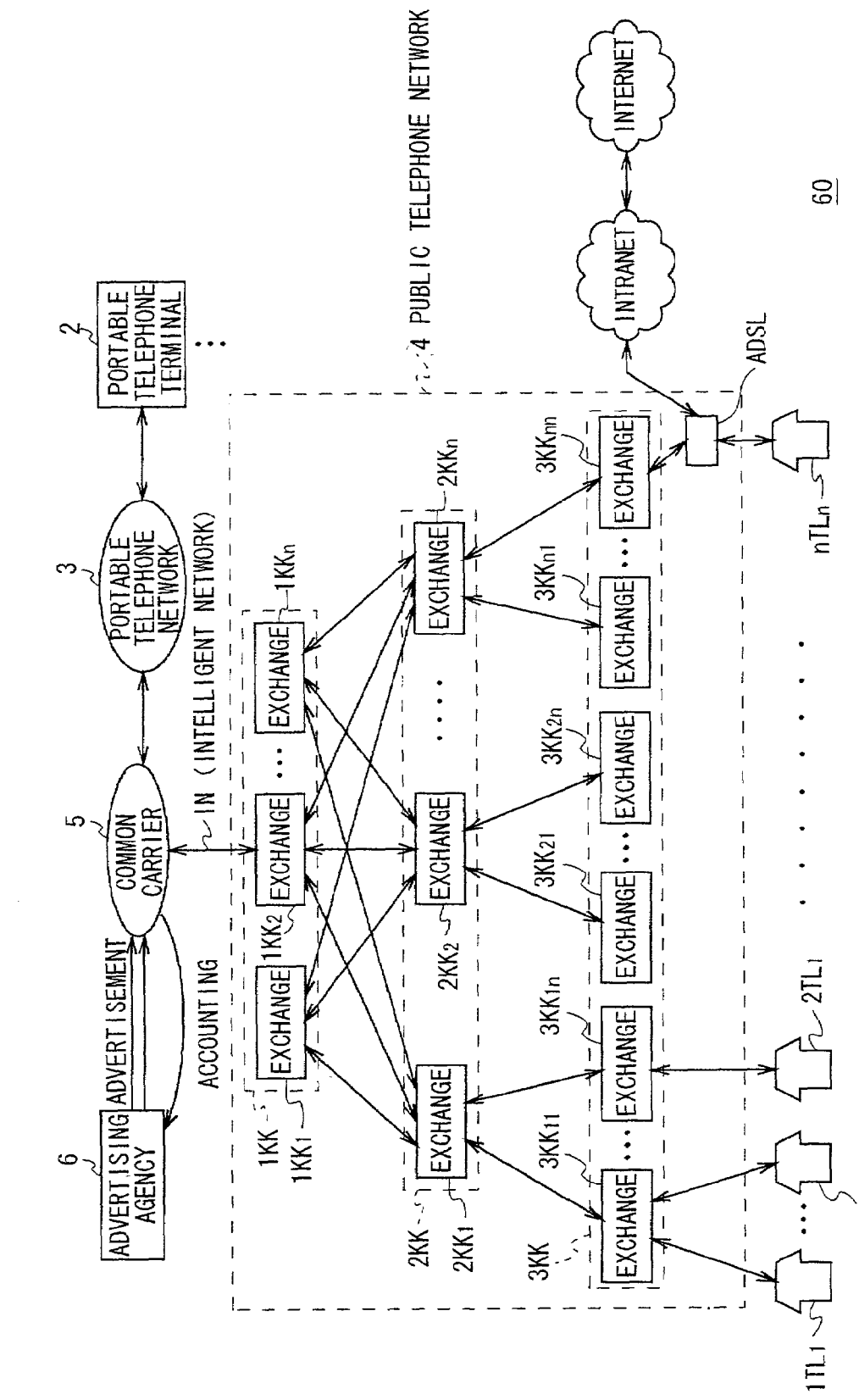
FIG. 27 is a block diagram of the configuration of the communication system according to another embodiment of the present invention.

Furthermore, although in the above mentioned embodiments, the portable telephone network 3 and the public telephone network 4 are applied as line connection means, the present invention is not limited to this application. It is essential only that the lines between the communications terminals be connected, and as the line connection means, for example like a communication system 60 shown in FIG. 27, Intranet, Internet or the like can be widely applied, which is connected using a line other than the public telephone network 4 by a so-called dry copper system branching the telephone $nTL_n$ and the exchange $3KK_{nn}$ through an asymmetric digital subscriber line (ADSL).

In addition, according to the above mentioned embodiment, the common carriers 5, 21, and 41 are applied as communication management means. However, the present invention is not limited to this application. That is, various other communication management means can be widely applied only if they can manage the communication among communication terminal devices through line connection means.

Furthermore, in the above mentioned embodiments, the advertising agency 6 is adopted as information supply means. However, the present invention is not limited to this application. That is, various other information supply means can be widely adopted only if they can distribute distribution information to communication management means.

In the above mentioned embodiments, the common carrier 5 is adopted as information distribution means. However, the present invention is not limited to this application. That is, various other information distribution means can be used only if they can distribute distribution information from information supply means to communication terminal devices.

Furthermore, according to the above mentioned embodiments, the common carriers 5, 21, and 41 are adopted as privilege assignment means. However, the present invention is not limited to this application. That is, various other privilege assignment means can be used only if they can assign a privilege to a user of a communication terminal device to which distribution information is distributed.

In addition, according to the above mentioned embodiments, the portable telephone terminals 2 and 2A, and the telephones $1TL_1$ to $nTL_n$ and $1ATL_1$ to $nATL_n$ are used as communication terminal devices. However, the present invention is not limited to this application. For example, a personal handy phone system (PHS), a personal computer, etc. can be used, and various other communication terminal devices can be widely used.

In addition, according to the above mentioned embodiment, the common carriers 5, 21, and 41 use the advertisement information provided by the advertising agency 6 as distribution information. However, the present invention is not limited to this application. That is, various other information can be widely used only if it can be distributed to the portable telephone terminals 2 and 2A, the telephones $1TL_1$ to $nTL_n$ and $1ATL_1$ to $nATL_n$, etc. of users.

Furthermore, according to the above mentioned embodiment, the voice recognition unit 22 of the common carrier 21 is adopted as keyword extraction means. However, the present invention is not limited to this application. That is, various other keyword extraction means can be widely used only if they can extract a predetermined keyword by voice-recognizing the telephone conversation between users through communication terminal devices.

As described above, according to the present invention, a communication system comprises: line connection means for connecting lines between communication terminal devices; communication management means for managing communication between the communication terminal devices through the line connection means; information supply means for supplying distribution information to the communication management means; information distribution means, provided in the communication management means, for distributing the distribution information to a corresponding communication terminal device; privilege assignment means, provided in the communication management means, for assigning a privilege to a user of the communication terminal device to which the distribution information is distributed. With the configuration, a charge to a user for communication between communication terminal devices can be reduced in return for the distribution of the distribution information to the communication terminal devices of the users, thereby realizing a communication system capable of remarkably improving the convenience for users.

Further, according to the present invention, a communication management system for managing communication between communication terminal devices comprises: information distribution means for distributing distribution information to the communication terminal devices to which communication lines are connected; and privilege assignment means for assigning a privilege to a user of the communication terminal device to which the distribution information is distributed. With the configuration, a charge to a user for communication between communication terminal devices can be reduced in return for the distribution of the distribution information to the communication terminal devices of the users, thereby realizing a communication management system capable of remarkably improving the convenience for users.

Still further, according to the present invention, a communication management method for managing communication between communication terminal devices comprises: a first step of distributing distribution information to the communication terminal devices to which communication lines are connected; and a second step of assigning a privilege to a user of the communication terminal device to which the distribution information is distributed. With the configuration, a charge to a user for communication between communication terminal devices can be reduced in return for the distribution of the distribution information to the communication terminal devices of the users, thereby realizing a communication management method remarkably improving the convenience for users.

Further yet, according to the present invention, a communication system comprises: plural communication terminal devices for communicating with each other via a channel; information supplying means for supplying information to a designated communication terminal device among the communication terminal devices; and privilege assignment means for, after being notified by the communication terminal device that the information is confirmed by a user of the communication terminal device, assigning a privilege to the notified communication of the communication terminal device. With the configuration, a charge to a user for communication between communication terminal devices can be reduced in return for the distribution of the distribution information to the communication terminal devices of the users, thereby realizing a communication system capable of remarkably improving the convenience for users.

Furthermore, according to the present invention, a communication management method for managing the communication of communication terminal device connected via a channel comprises: the steps of supplying information via the channel corresponding to the communication terminal device to a the designated communication terminal device; and receiving a confirmation result that the information supplied from the communication terminal device has been confirmed. With the configuration, a charge to a user for communication between communication terminal devices can be reduced in return for the distribution of the distribution information to the communication terminal devices of the users, thereby realizing a communication management method remarkably improving the convenience for users.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication system comprising:
   line connection means for connecting lines between communication terminal devices;
   communication management means for managing communication between the communication terminal devices through said line connection means;
   information supply means for supplying advertisement information to said communication management means;
   information distribution means, provided in said communication management means, for distributing the advertisement information to a corresponding communication terminal device; and
   privilege assignment means, provided in said communication management means, for assigning a privilege to a user of the communication terminal device to which the advertisement information is distributed,
   wherein said corresponding communication terminal device comprises keyword extraction means for extracting a keyword by recognizing a voice of said user, wherein the keyword is used by said user in a conversation with another user, and
   wherein said information distribution means selects a particular advertisement information from among plural pieces of said advertisement information based on an extraction result by said keyword extraction means, and supplies said particular advertisement information to said corresponding communication terminal device.

2. The communication system according to claim 1 wherein said privilege assignment means assigns a privilege after said particular advertisement information is confirmed to have been browsed or viewed by a user of the communication terminal device.

3. A communication management system for managing communication between communication terminal devices, said system comprising:
   information distribution means for distributing advertisement information to said communication terminal devices to which communication lines are connected; and
   privilege assignment means for assigning a privilege to a user of one of said communication terminal devices to which the advertisement information is distributed,
   wherein said corresponding communication terminal device comprises keyword extraction means for extracting a keyword by recognizing a voice of said user, wherein the keyword is used by said user in a conversation with another user, and
   wherein said information distribution means selects a particular advertisement information from among plural pieces of said advertisement information based on an extraction result by said keyword extraction means, and supplies said the particular advertisement information to said communication terminal device.

4. The communication management system according to claim 3 wherein said communication terminal device is a telephone.

5. The communication management system according to claim 3 wherein said information distribution means distributes said advertisement information by temporarily suspending the communication while said communication terminal device is communicating.

6. The communication management system according to claim 3 wherein said information distribution means supplies the particular advertisement information in parallel with voice information in said communication while said communication terminal device is communicating.

7. The communication management system according to claim 3, further comprising position detection means for detecting a position of said user.

8. A communication management method for managing communication between communication terminal devices, said method comprising:
   a first step of distributing advertisement information to said communication terminal devices to which communication lines are connected; and
   a second step of assigning a privilege to a user of one of said communication terminal devices to which the advertisement information is distributed,
   wherein said communication terminal is a telephone, and in said first step, after extracting a predetermined keyword by recognizing voice in a conversation of said user between said telephones, wherein the predetermined keyword is used by said user in the conversation with another user, a particular advertisement information is selected from among plural pieces of said advertisement information based on the extraction result, and the particular advertisement information is distributed to said communication terminal device.

9. The communication management method according to claim 8 wherein in said second step, after said particular advertisement information is confirmed to have been browsed or viewed by the user of said communication terminal device, a privilege is assigned according to the confirmation.

10. The communication management method according to claim 8 wherein said communication terminal device is a telephone; and in said first step, said advertisement information is distributed by temporarily suspending the communication during the communication between the telephones.

11. The communication management method according to claim 8 wherein said communication terminal device is a telephone; and in said first step, said particular advertisement information is distributed in parallel with voice information in the communication during the communication between the telephones.

12. The communication management method according to claim 8 wherein in said first step, after detecting a position of said user, corresponding advertisement information is selected from among plural pieces of said advertisement information based on the detected position, and the corresponding advertisement information is distributed to said communication terminal device.

13. A communication system comprising:
plural communication terminal devices for communicating with each other via a channel;
information supplying means for supplying advertisement information to a designated communication terminal device among said communication terminal devices; and
privilege assignment means for, after being notified through a notification by said communication terminal device that said advertisement information is confirmed by a user of said communication terminal device, assigning a privilege to the notification of said communication terminal device,
wherein said information supplying means comprises keyword extracting means for, while recognizing content of said communication from said communication terminal device, selectively extracting a keyword contained in said communication contents, wherein said keyword is used by a user of a corresponding communication terminal device from the plural communication terminal devices in a conversation with another user, and wherein based on the keyword extracted by the keyword extracting means, supplying a particular advertisement information corresponding to said keyword to a the corresponding communication terminal device.

14. The communication system according to claim 13 wherein said information supplying means comprises means for recording a distribution history of said supplied advertisement information, and means for updating said distribution history when notified by said designated communication terminal device.

15. The communication system according to claim 13 wherein said information supplying means temporarily suspends communication of at least one of said communication terminal devices after communication starts and supplies said advertisement information during said suspended period, or supplies said advertisement information in synchronization with said communication or after said communication.

16. The communication system according to claim 13 wherein said communication terminal device for, when said advertisement information is supplied from said information supplying means, outputting a notification of said information as confirmation information based on at least one of a predetermined operation and a voice that is inputted externally.

17. The communication system according to claim 13 wherein said communication terminal device further comprises outputting means for outputting language information based on the keyword extracted by the keyword extracting means to said information supplying means, wherein said information supplying means supplies information corresponding to said language information given from said communication terminal device to a corresponding communication terminal device.

18. The communication system according to claim 13 wherein said information supplying means comprises position detection means for detecting a position of a designated communication terminal device, and based on the position information given from the position detection means supplies information corresponding to said position information to a corresponding communication terminal device.

19. The communication system according to claim 13 wherein said communication terminal device comprises position detection means for detecting a position of said communication terminal device, and means for outputting position information detected by the position detection means to said information supplying means; and said information supplying means, based on the position information given from said communication terminal device, supplies advertisement information corresponding to said position information to a corresponding communication terminal device.

20. A communication management method for managing communications of a communication terminal device connected via a channel, said method comprising the steps of:
supplying advertisement information via the channel corresponding to said communication terminal device to a designated communication terminal device; and
receiving a confirmation result that said information supplied from said communication terminal device has been confirmed,
wherein the step of supplying information includes recognizing content of a communication sent over the channel, selectively extracting a keyword from the content of said communication, wherein said content comprises a conversation between users connected via the channel, outputting language information based on the extracted keyword; and supplying a particular advertisement information corresponding to said language information given from said communication terminal device to said designated communication terminal device.

21. The communication management method according to claim 20 wherein in said step of supplying advertisement information, a distribution history of said advertisement information is stored, and in said step of receiving the confirmation result, said distribution history is updated when said confirmation result is received from said designated communication terminal device.

22. The communication management method according to claim 20 wherein said communication terminal device, when said particular advertisement information is supplied, outputs a confirmation result of said information as confirmation information based on at least one of a predetermined operation and a voice that is inputted externally.

* * * * *